United States Patent
Roberts et al.

(10) Patent No.: US 10,310,697 B2
(45) Date of Patent: Jun. 4, 2019

(54) SYSTEMS AND METHODS FOR REMOTE CONTROL DEVICE BASED INTERACTION WITH A GRAPHICAL USER INTERFACE

(71) Applicant: Verizon and Redbox Digital Entertainment Services, LLC, Basking Ridge, NJ (US)

(72) Inventors: Brian F. Roberts, Dallas, TX (US); Imran Arif Maskatia, Palo Alto, CA (US); Paul Bradley Bowers, Winfield, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 729 days.

(21) Appl. No.: 14/093,280

(22) Filed: Nov. 29, 2013

(65) Prior Publication Data

US 2014/0157204 A1    Jun. 5, 2014

Related U.S. Application Data

(60) Provisional application No. 61/732,247, filed on Nov. 30, 2012.

(51) Int. Cl.
*H04N 21/20* (2011.01)
*H04N 21/40* (2011.01)
(Continued)

(52) U.S. Cl.
CPC .......... *G06F 3/0481* (2013.01); *G06F 3/0482* (2013.01); *G06Q 30/02* (2013.01); *G06Q 30/0607* (2013.01); *G06Q 30/0609* (2013.01); *H04L 67/10* (2013.01); *H04N 21/218* (2013.01); *H04N 21/2543* (2013.01); *H04N 21/27* (2013.01); *H04N 21/472* (2013.01);
(Continued)

(58) Field of Classification Search
CPC ............. G06F 3/04842; G06F 3/04892; G06F 3/0482; G06F 3/01; H04N 21/20; H04N 21/40
USPC .................. 715/819, 820, 829, 843
See application file for complete search history.

(56) References Cited

U.S. PATENT DOCUMENTS 6,292,188 B1 *   9/2001   Carlson .................. G06F 3/0482
                                                                   707/E17.111
6,678,891 B1 *   1/2004   Wilcox .............. G06Q 30/0601
                                                                   348/E5.105
(Continued)

*Primary Examiner* — Doon Y Chow
*Assistant Examiner* — Le V Nguyen

(57) ABSTRACT

An exemplary method includes a user interface system providing a graphical user interface view that includes a high-level menu including first and second of high-level menu options respectively associated with first and second sub-menus, assigning the first high-level menu option an active status, activating the first sub-menu such that the first sub-menu is navigable with a directional pad ("D-pad") of a remote control device while the first high-level menu option has the active status, receiving user input provided by way of a toggle button of the remote control device designated to toggle between the first and second high-level menu options, toggling the active status from the first high-level menu option to the second high-level menu option, and activating the second sub-menu such that the second sub-menu is navigable with the D-pad of the remote control device while the second high-level menu option has the active status.

25 Claims, 16 Drawing Sheets

(51) Int. Cl.
*G06F 3/01* (2006.01)
*G06F 3/0481* (2013.01)
*H04L 29/08* (2006.01)
*G06F 3/0482* (2013.01)
*H04N 21/4722* (2011.01)
*H04N 21/472* (2011.01)
*H04N 21/218* (2011.01)
*H04N 21/482* (2011.01)
*H04N 21/27* (2011.01)
*G06Q 30/02* (2012.01)
*G06Q 30/06* (2012.01)
*H04N 21/2543* (2011.01)
*H04N 21/488* (2011.01)

(52) U.S. Cl.
CPC ... *H04N 21/4722* (2013.01); *H04N 21/47202* (2013.01); *H04N 21/47214* (2013.01); *H04N 21/482* (2013.01); *H04N 21/4882* (2013.01); *H04N 21/20* (2013.01); *H04N 21/40* (2013.01)

(56) References Cited

U.S. PATENT DOCUMENTS

| | | | | |
|---|---|---|---|---|
| 6,690,391 | B1* | 2/2004 | Proehl | G06F 3/0362 715/720 |
| 7,191,411 | B2* | 3/2007 | Moehrle | G06F 17/30126 715/829 |
| 8,977,963 | B1* | 3/2015 | Joyce | G11B 27/34 715/716 |
| 2001/0017615 | A1* | 8/2001 | Lin | G08C 19/28 345/173 |
| 2004/0150670 | A1* | 8/2004 | Feldman | G06F 3/04883 715/781 |
| 2004/0233239 | A1* | 11/2004 | Lahdesmaki | G06F 3/0482 715/810 |
| 2006/0267995 | A1* | 11/2006 | Radloff | G11B 27/105 345/530 |
| 2007/0229465 | A1* | 10/2007 | Sakai | G08C 17/00 345/173 |
| 2008/0168382 | A1* | 7/2008 | Louch | G06F 9/4443 715/781 |
| 2009/0125842 | A1* | 5/2009 | Nakayama | G06F 3/0482 715/835 |
| 2009/0187825 | A1* | 7/2009 | Sandquist | G06F 17/241 715/719 |
| 2010/0064258 | A1* | 3/2010 | Gorczowski | G06F 3/0482 715/841 |
| 2010/0137693 | A1* | 6/2010 | Porras | A61M 1/16 600/301 |
| 2010/0208145 | A1* | 8/2010 | VanDuyn | G08C 19/28 348/734 |
| 2011/0154405 | A1* | 6/2011 | Isaias | H04N 5/44513 725/53 |
| 2012/0216117 | A1* | 8/2012 | Arriola | H04N 21/4821 715/716 |
| 2012/0221974 | A1* | 8/2012 | Trotta | G06F 3/0485 715/823 |
| 2012/0311470 | A1* | 12/2012 | Roberts | G06F 17/30893 715/763 |
| 2013/0211565 | A1* | 8/2013 | Kimoto | G06F 17/30752 700/94 |

* cited by examiner

SYSTEMS AND METHODS FOR REMOTE CONTROL DEVICE BASED INTERACTION WITH A GRAPHICAL USER INTERFACE

RELATED APPLICATIONS

The present application claims priority under 35 U.S.C. § 119(e) to U.S. Provisional Patent Application No. 61/732,247, filed Nov. 30, 2012. The contents of the provisional patent application are hereby incorporated by reference in their entirety.

BACKGROUND INFORMATION

Remote control devices are commonly used to operate a wide variety of consumer electronic devices. For example, a handheld infrared remote control device is commonly used to operate a television device, a set-top box device, a stereo system, an entertainment system, or any other similar type of electronic device.

The use of a remote control device to control an electronic device provides a user of the remote control device with a certain level of convenience. However, the user may experience difficulty, inconvenience, and/or frustration when using such a remote control device to interact with certain graphical user interfaces provided by some electronic devices. For example, conventionally, the use of a remote control device by a user to navigate through several levels of options presented in a graphical user interface of a smart television device may be tedious.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods for remote control device based interaction with a graphical user interface ("GUI") are described herein. In certain examples, the systems and methods described herein may provide a GUI view for display on a display screen, the GUI view including a high-level menu of a plurality of high-level menu options respectively associated with a plurality of sub-menus. A first high-level menu option included in the plurality of high-level menu options may be assigned to have an active status. While the first high-level menu option has the active status, a first sub-menu included in the plurality of sub-menus and that corresponds to the first high-level menu option may be navigable by a user providing input by way of a directional pad ("D-pad") of a remote control device.

One or more buttons of the remote control device that are separate from the D-pad of the remote control device may be designated as input to toggle the active status between the high-level menu options. Accordingly, the systems and methods described herein may receive, while the first high-level menu option has the active status, user input provided by way of a button of the remote control device, the button being separate from the D-pad of the remote control device and designated as input to toggle the active status between the high-level menu options. In response to receiving the user input provided by way of the button designated as input to toggle the active status between the high-level menu options, the systems and methods may toggle the active status from the first high-level menu option to a second high-level menu option included in the plurality of high-level menu options. While the second high-level menu option has the active status, a second sub-menu included in the plurality of sub-menus and that corresponds to the second high-level menu option may be navigable by the user providing input by way of the D-pad of the remote control device.

The systems and methods described herein may allow a user using a remote control device to control one or more electronic devices (e.g., a television device, a set-top box device, a stereo system, an entertainment system, etc.) and/or to conveniently, intuitively, and/or efficiently interact with a GUI of the electronic device(s), such as by conveniently, intuitively, and/or efficiently navigating among various menus, sub-menus, and options included in the GUI.

Exemplary methods and systems of remote control device based interaction with a GUI will now be described in reference to the drawings.

Figure 1:
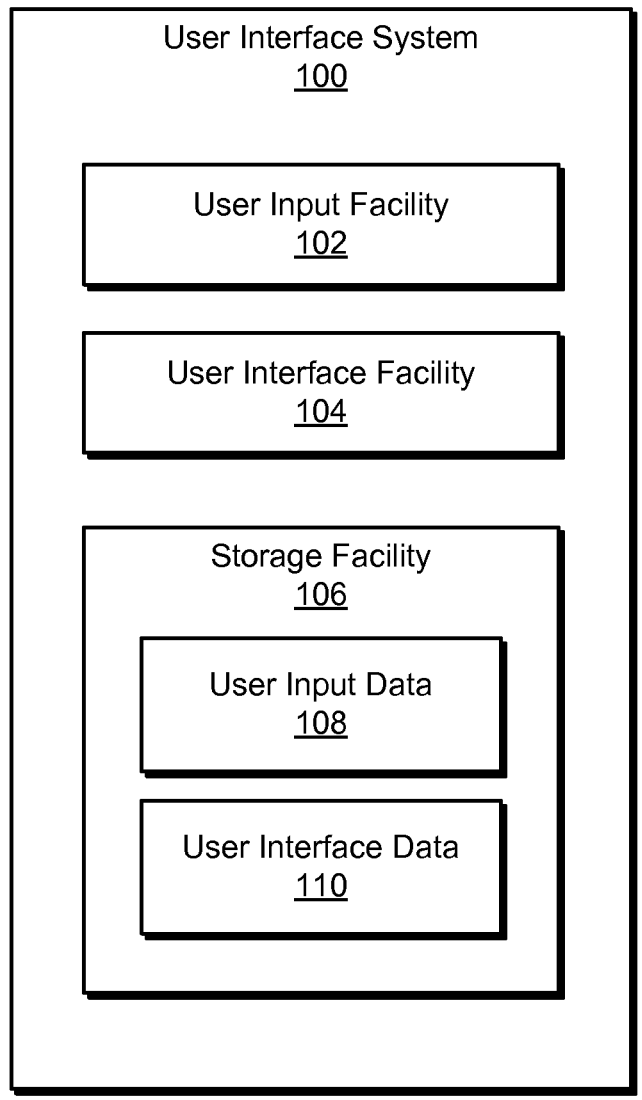
FIG. 1 illustrates an exemplary user interface system according to principles described herein.

FIG. 1 illustrates an exemplary user interface system 100 ("system 100"). As shown, system 100 may include, without limitation, a user input facility 102, a user interface facility 104, and a storage facility 106 selectively and communicatively coupled to one another. Any suitable communication technologies may be employed to facilitate communications between facilities 102-106.

Although facilities 102-106 are shown to be separate facilities in FIG. 1, any of those facilities may be combined into a single facility or split into additional facilities as may serve a particular implementation. Additionally or alternatively, one or more of the facilities 102-106 may be omitted from and external to system 100 in other implementations. Facilities 102-106 will now be described in more detail.

Storage facility 106 may maintain user input data 108 generated and/or used by user input facility 102 and representative of user input received by system 100. Storage facility 106 may also maintain user interface data 110 generated and/or used by user interface facility 104, such as data representative of a GUI and/or GUI views generated by user interface facility 104. Storage facility 106 may maintain additional or alternative data as may serve a particular implementation.

User input facility 102 may be configured to receive user input data associated with (e.g., representative of) user input received through any of a variety of remote communication technologies including, but not limited to, infrared (e.g., infrared command codes), Wi-Fi, radio, Bluetooth, and/or other wireless signaling. User input facility 102 may receive the user input data (e.g., signaling representing user input) from any suitable source. For example, user input facility 102 may receive user input data from any suitable remote control device (e.g., a consumer electronics remote control device) that includes a D-pad and one or more buttons separate from the D-pad and that is configured to transmit signals representing user input data to user input facility 102 by way of one or more remote communication technologies.

User interface facility 104 may be configured to perform any of the user interface operations described herein, including providing a user interface through which a user may control operations of and/or otherwise interact with an electronic device. For example, user interface facility 104 may provide a GUI for display on a display screen associated with an electronic device with which a user may interact by providing input to the electronic device by way of a remote control device.

To this end, user interface facility 104 may map operations such as user interface operations and/or other operations of the electronic device to specific user inputs that may be provided by a user utilizing a remote control device. For example, a D-pad of a remote control device may be mapped to operations for navigating within menus and menu options of a GUI that may be provided by user interface facility 104. Additionally, one or more buttons of the remote control device that are separate from the D-pad may be mapped to one or more additional operations for navigating within menus and menu options of the GUI. As described herein, for example, one or more buttons of the remote control device that are separate from the D-pad may be designated as input for toggling an active status between high-level menu options included in a high-level menu of a GUI, which may facilitate convenient, intuitive, and/or efficient user navigation within menus and menu options of the GUI with the remote control device.

User interface facility 104 may be configured to access user input data representative of user input received from a remote control device. For example, user interface facility 104 may access user input data from user input facility 102 and/or storage facility 106. In response to accessing user input, user interface facility 104 may determine one or more operations that are mapped to the user input and perform those operations. For example, user interface facility 104 may update user interface content provided for display in a GUI in response to certain user input. Examples of user interface operations that may be performed in response to certain user input are described herein.

Figure 2:
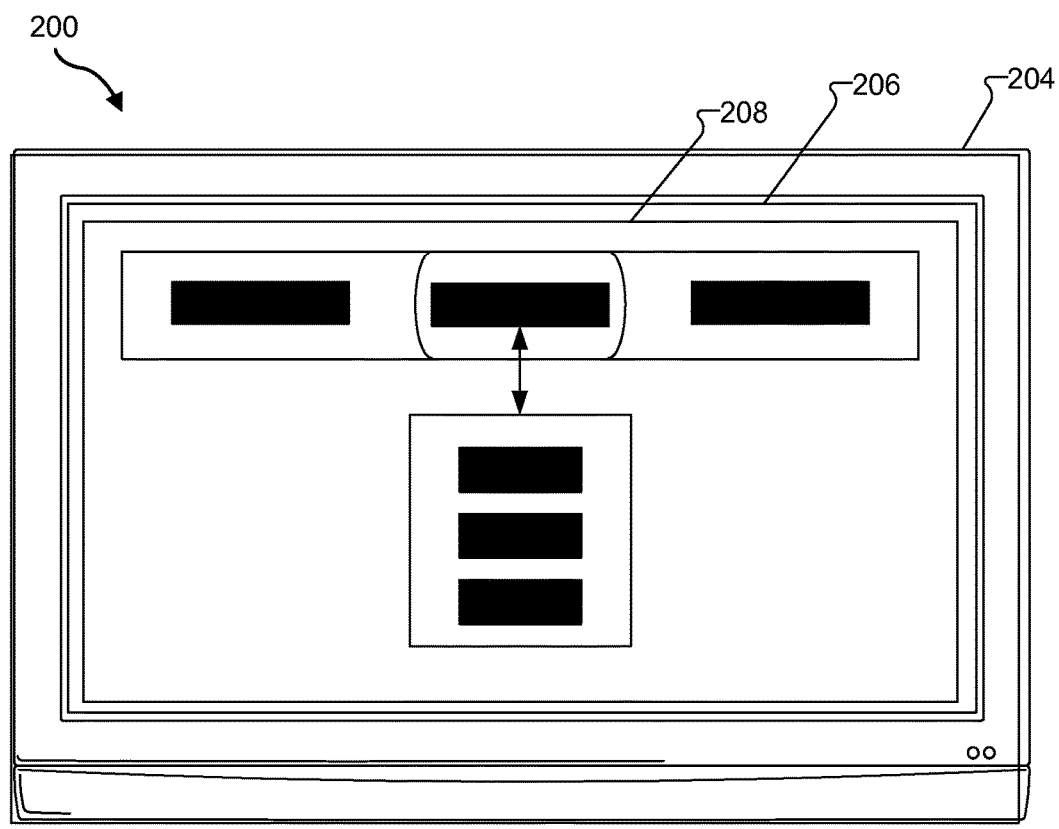
FIG. 2 illustrates an exemplary implementation of the system of FIG. 1 according to principles described herein.
Figure 2:
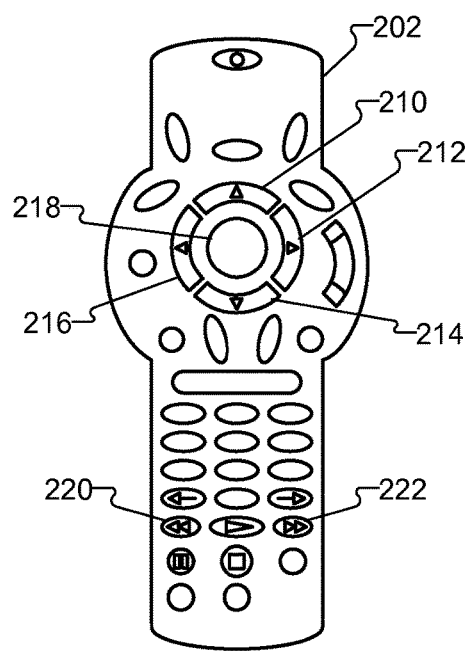

FIG. 2 illustrates an exemplary implementation 200 of system 100 in which an exemplary remote control device 202 is configured to communicate with an electronic device 204, which may be a smart television device or other electronic device configured to provide a GUI for display on a display screen 206 and with which a user may interact by providing input by way of the remote control device 202. In the illustrated example, the electronic device 204 is displaying a GUI 208 that includes certain menus and sub-menus that may be navigated by a user providing input by way of the remote control device 202.

As shown in FIG. 2, remote control device 202 may include a D-pad having an up button 210, a right button 212, a down button 214, a left button 216, and a select button 218 configured for use by the user to provide input to navigate various menus, options, and GUIs displayed on the display screen 206 of the electronic device 204. For example, the user may select buttons 210-216 of the D-pad to provide directional input configured to cause a selector object (e.g., a cursor, a highlighter box, etc.) to move directionally and/or incrementally from one selectable option to another selectable option within a menu and/or GUI.

The exemplary D-pad of remote control device 202 shown in FIG. 2 is illustrative only. Remote control device 202 may include any form of D-pad or other directional input mechanisms configured for use by a user to directionally and/or incrementally navigate various menus, options, and GUIs displayed on the display screen 206 of the electronic device 204, such as by directionally and/or incrementally moving a selector object from one selectable option to another selectable option within a menu and/or GUI.

In addition to a D-pad, remote control device 202 may include one or more other buttons that are separate from the D-pad and configured to be selected by the user to provide other user input to electronic device 204. For example, remote control device 202 may include a backward skip button 220 and a forward skip button 222. In certain implementations, buttons 220 and 222 may be typically configured for use to skip a media program playback position backward and forward in time during playback of a media program. As described herein, buttons 220 and 222 may be additionally or alternatively designated as input for toggling an active status between menu options of a menu included in a GUI. While certain examples described herein are directed to specific buttons, such as buttons 220 and 222, being designated as input for toggling an active status between menu options of a menu included in a GUI, remote control device 202 may include any other buttons and/or input mechanisms (e.g., a touchpad with virtual buttons, voice recognition, etc.) that are separate from the D-pad and that may be designated (e.g., by user interface facility 104) as input for toggling an active status between menu options of a menu included in a GUI as may serve a particular implementation.

Remote control device 202 shown in FIG. 2 is illustrative of one example of a remote control device that may be used to provide input to electronic device 204 as described herein. Other suitable remote control devices may be used in other implementations in accordance with the principles described herein. For example, a remote control device in another implementation may include an electronic device such as a tablet computer, smartphone, personal digital assistant ("PDA"), or any other similar electronic device configured to wirelessly communicate with electronic device 204 and that executes computing code (e.g., runs an application) that provides a virtual remote control device for interacting with electronic device 204, such as computing code that virtually emulates the physical buttons and/or operations of remote control device 202 or another suitable remote control device.

FIGS. 3-7 illustrate examples of remote control device based navigation of menus and menu options included in a GUI provided for display by an electronic device. The examples are illustrated in reference to exemplary views of menus and menu options in the GUI.

Figure 3:
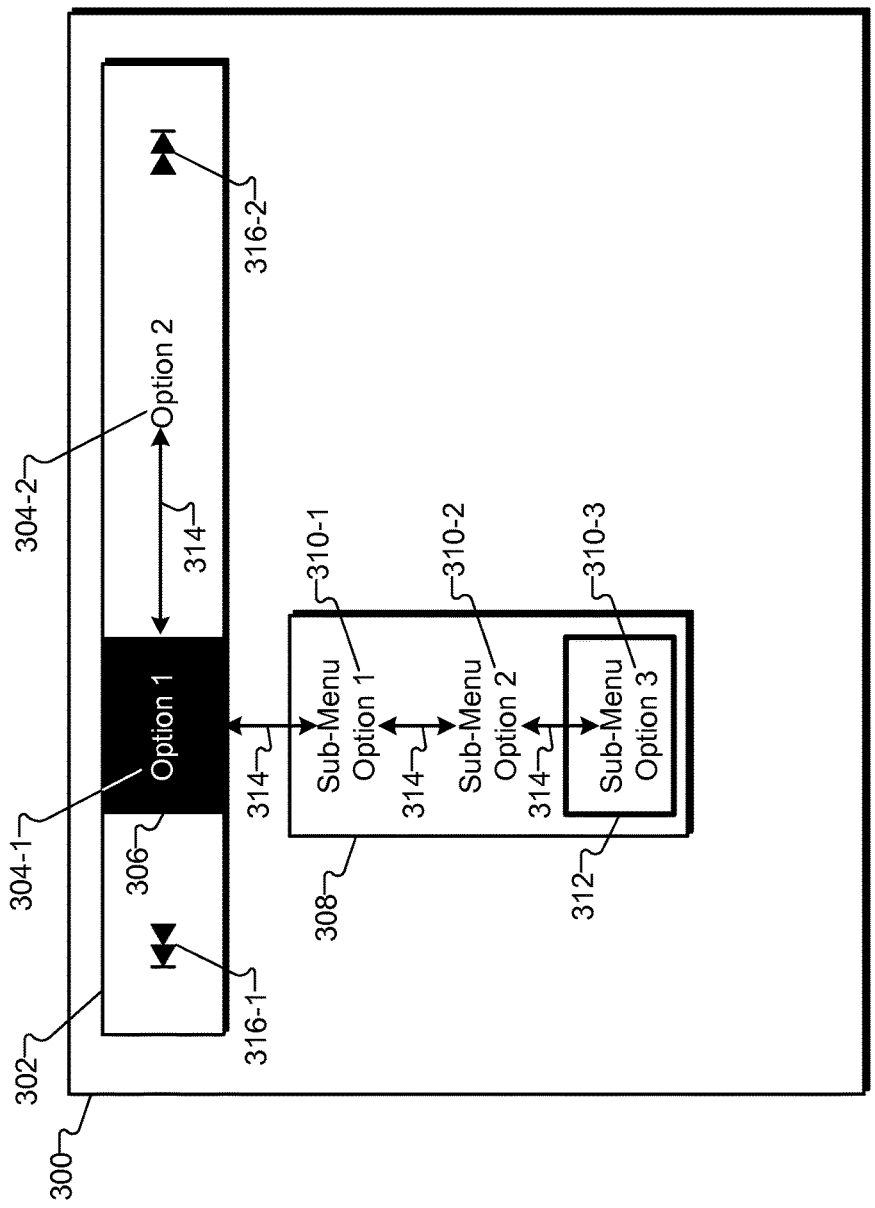
FIGS. 3-13 illustrate exemplary graphical user interface views according to principles described herein.

FIG. 3 illustrates an exemplary GUI view 300 that may be provided by user interface facility 104 for display on a display screen associated with an electronic device. As shown, GUI view 300 may include a high-level menu 302 with one or more high-level menu options 304 (e.g., high-level menu option 304-1 labeled "Option 1" and high-level menu option 304-2 labeled "Option 2"). While the high-level menu 302 is displayed horizontally across the top of GUI view 300 in this example, in other embodiments user interface facility 104 may provide a high-level menu for display in any other orientation (e.g., horizontally along the bottom or vertically along the right or left side of a GUI view), and may be configured to move the orientation of the high-level menu from one position to another within the GUI view.

At a given time, one of the high-level menu options 304 included in high-level menu 302 is exclusively assigned an active status. In FIG. 3, for example, high-level menu option 304-1 is assigned the active status, as visually indicated by an active status indicator 306. User interface facility 104 may be configured to assign the active status to a particular high-level menu option 304 in response to a selection of the high-level menu option 304, such as a selection of the high-level menu option 304 by a user (e.g., by a user using a remote control device to provide input to select the high-level menu option 304) or in accordance with a default selection (e.g., high-level menu option 304-1 may be selected as a default option and assigned active status upon launch of GUI view 300). User interface facility 104 may be configured to keep the active status assigned to the selected high-level menu option 304 until another high-level menu option 304 in the high-level menu 302 is selected to have the active status.

In response to the active status being assigned to a high-level menu option 304 included in the high-level menu 302, user interface facility 104 may activate a sub-menu associated with the high-level menu option 304 assigned the active status. In certain examples, the activating of the sub-menu may include user interface facility 104 providing a visual representation of at least a portion of the sub-menu for display. For example, in FIG. 3, a sub-menu 308 corresponding to high-level menu option 304-1 is displayed in response to high-level menu option 304-1 having the active status.

Additionally or alternatively, the activating of the sub-menu may include user interface facility 104 making the sub-menu navigable by a user with a remote control device. Accordingly, while high-level menu option 304-1 has the active status, sub-menu 308 corresponding to the high-level menu option 304-1 may be navigable by a user providing input to a remote control device.

In certain examples, navigation of the sub-menu may include user interface facility 104 selecting one or more various options within the sub-menu in accordance with user input provided by a user using a remote control device. For example, the user may use the D-pad of remote control device 202 to provide directional input to direct user interface facility 104 to move an on-screen selector within the sub-menu to select one or more options within the sub-menu.

To illustrate, as shown in GUI view 300, sub-menu 308 may include one or more sub-menu options 310 (e.g., sub-menu option 310-1 through sub-menu option 310-3) configured to be navigated by a user using a D-pad of a remote control device when sub-menu 308 is activated. For example, a selector 312 may be positioned within sub-menu 308. A position of selector 312 within sub-menu 308 may visually indicate a selection of a sub-menu option 310. In FIG. 3, selector 312 is positioned to indicate a selection of sub-menu option 310-3.

User interface facility 104 may incrementally move selector 312 from position to position in sub-menu 308 in accordance with directional user input provided by a user using a D-pad of a remote control device. In the example shown in FIG. 3, for example, a user may provide directional input to direct user interface facility 104 to incrementally move selector 312 from sub-menu option 310-3 to sub-menu option 310-2. Arrows 314 shown in FIG. 3 represent available directional paths for selector 312 to incrementally travel from menu option to menu option in GUI view 300 in response to directional inputs provided by a user using a D-pad of a remote control device. The configuration of arrows 314 may be different for other configurations of menus and menu options in a GUI view.

When selector 312 is positioned to indicate a selection of a sub-menu option 310, the user may provide, and user interface facility 104 may receive, user input to invoke performance of one or more operations mapped to the sub-menu option 310. For example, the user may select the select button 218 of the D-pad of the remote control device 202 to invoke performance of one or more operations mapped to the currently selected sub-menu option 310.

While a high-level menu option included in a high-level menu has the active status, a user may provide input by way of a remote control device to direct system 100 to toggle the active status between high-level menu options. System 100 may receive the user input, and in response to the user input, user interface facility 104 may toggle the active status between the high-level menu options of the high-level menu by moving the active status from one high-level menu option to another high-level menu option in the high-level menu. This may be performed in any suitable way. For example, user interface facility 104 may remove the active status from a first high-level menu option included in the high-level menu and assign the active status to a second high-level menu option included in the high-level menu. In response to the removal of the active status from the first high-level menu option, user interface facility 104 may deactivate a first sub-menu corresponding to the first high-level menu option. Deactivation of the first sub-menu may include removing a visual representation of the first sub-menu from GUI view 300 and/or deactivating navigation of the first sub-menu such that the sub-menu is no longer navigable by a user (e.g., with a D-pad of a remote control device). In response to the assigning of the active status to the second high-level menu option, user interface facility 104 may activate a second sub-menu corresponding to the second high-level menu option. Activation of the second sub-menu may include presenting a visual representation of the second sub-menu in GUI view 300 and/or activating navigation of the second sub-menu such that the second sub-menu becomes navigable by a user (e.g., with a D-pad of a remote control device).

In certain examples, user interface facility 104 may be configured to toggle the active status between high-level menu options of a high-level menu in response to certain user input provided by a user using a D-pad of a remote control device. For example, in response to user input provided by way of a D-pad of a remote control device, user interface facility 104 may move a selector from a position on a first high-level menu option to a position on a second high-level menu option. In response to this movement of the selector, user interface facility 104 may toggle the active status from the first high-level menu option to the second high-level menu option.

Using FIG. 3 as an example, a user may use a D-pad of a remote control device to provide input to direct user interface facility 104 to move selector 312 incrementally from sub-menu option 310-3 to sub-menu option 310-2, from sub-menu option 310-2 to sub-menu option 310-1, from sub-menu option 310-1 to high-level menu option 304-1, and from high-level menu option 304-1 to high-level menu option 304-2. In response to the movement of selector 312 from high-level menu option 304-1 to high-level menu option 304-2, user interface facility 104 may toggle the active status from high-level menu option 304-1 to high-level menu option 304-2. The toggling may include user interface facility 104 deactivating sub-menu 308, such as by removing a visual representation of sub-menu 308 from GUI view 300 and/or deactivating navigation of sub-menu 308. The toggling may further include user interface facility 104 activating another sub-menu corresponding to the second high-level menu option, such as by presenting a visual representation of the other sub-menu in GUI view 300 and/or activating navigation of the other sub-menu.

Additionally or alternatively, in certain examples, user interface facility 104 may be configured to toggle the active status between high-level menu options of a high-level menu in response to certain user input provided by way of one or more buttons of a remote control device that are separate from a D-pad of the remote control device and that are designated as input to toggle the active status between the high-level menu options. For example, one or more buttons of a remote control device that are separate from the D-pad of the remote control device may be designated by user interface facility 104 as input to toggle the active status between high-level menu options of a high-level menu. Accordingly, in response to a receipt of user input by way of one of the designated buttons, user interface facility 104 may toggle the active status between high-level menu options of a high-level menu.

Toggling of the active status between high-level menu options using the one or more designated buttons of a remote control device that are separate from the D-pad may provide a convenient, intuitive, and/or efficient way for a user using the remote control device to toggle the active status between high-level menu options of a high-level menu. The use of the buttons designated for toggling active status may be more convenient and/or efficient than the use of the D-pad to toggle the active status. For example, with selector 312 positioned at sub-menu option 310-3 as shown in FIG. 3, instead of a user having to provide multiple inputs with the D-pad to incrementally move selector 312 up through the tiers of sub-menu options 310 in sub-menu 308, from the sub-menu 308 to the first high-level menu option 304-1, and from the first high-level menu option 304-1 to the second high-level menu option 304-2, the user is able to provide a single input by way of a designated toggle button to toggle the active status from the first high-level menu option 304-1 to the second high-level menu option 304-2 regardless of the position of selector 312.

Any suitable input mechanism of a remote control device that is separate from the D-pad of the remote control device may be designated to toggle the active status between high-level menu options. In certain examples described herein, the forward skip button 222 and backward skip button 220 of remote control device 202, shown in FIG. 2, may be designated for toggling sequentially forward and backward, respectively, between high-level menu options in a high-level menu. This is illustrative only. Additional or alternative buttons or other input mechanisms of a remote control device that are separate from a D-pad of the remote control device may be designated to toggle the active status between high-level menu options of a high-level menu in other examples. A button or other input mechanism of a remote control device that is separate from a D-pad of the remote control device and that is designated to toggle the active status between menu options of a menu in a GUI may be referred to herein as a "designated toggle button" or a "toggle button."

In certain examples, user interface facility 104 may be configured to visually indicate, within a GUI view, toggle buttons designated to toggle the active status between high-level menu options. For example, user interface facility 104 may position graphical representations of the toggle buttons within a high-level menu (e.g., on either side of the high-level menu options included within the high-level menu). Additionally or alternatively, user interface facility 104 may position graphical representations of the toggle buttons in any suitable position within the GUI view.

To illustrate one example, in GUI view 300 of FIG. 3, graphical icons 316 (e.g., icon 316-1 and icon 316-2) representative of toggle buttons of a remote control device are displayed within high-level menu 302. In the illustrated example, icon 316-1 visually indicates a backward skip button and icon 316-2 visually indicates a forward skip button of a remote control device.

User interface facility 104 may be configured to detect a request to toggle the active status between high-level menu options of a high-level menu. In response to the request, user interface facility 104 may toggle the active status from the high-level menu option having the active status when the request is received to another high-level menu option (e.g., a next sequential high-level menu option) in the high-level menu.

In addition, user interface facility 104 may be configured to detect whether the request is associated with a designated toggle button (e.g., the request is initiated by a user selection of the designated toggle button) of a remote control device. If user interface facility 104 determines that the request is associated with a designated toggle button, user interface facility 104 may automatically reposition a selector object in a GUI view as part of the toggling of the active status from one high-level menu option to another high-level menu option. For the repositioning, user interface facility 104 may be configured to select a new position of a selector in any suitable way. For example, user interface facility 104 may be configured to automatically position the selector on the other high-level menu option to which the active status is being toggled or within a sub-menu of the other high-level menu option. When the selector is automatically moved to a position within the sub-menu, user interface facility 104 may position the selector at a predefined default position within the sub-menu (e.g., on a first-ordered sub-menu option in a sub-menu or on a sub-menu option positioned logically and/or spatially most proximate to the other high-level menu option and/or high-level menu) or at a last-known position of the selector within the sub-menu when the sub-menu was previously active.

To illustrate, with GUI view 300 displayed on a display screen, a user may select a designated toggle button of a remote control device, such as the forward skip button 222 of remote control device 202 to toggle the active status from high-level menu option 304-1 to high-level menu option 304-2. User interface facility 104 may detect the request and that the request is associated with the designated toggle button. In response, user interface facility 104 may toggle the active status from high-level menu option 304-1 to high-level menu option 304-2, which may include user interface facility 104 deactivating sub-menu 308 and activating a sub-menu corresponding to high-level menu option 304-2, as described herein. The toggling of the active status may also include user interface facility 104 repositioning selector 312 in GUI view 300.

Figure 4:
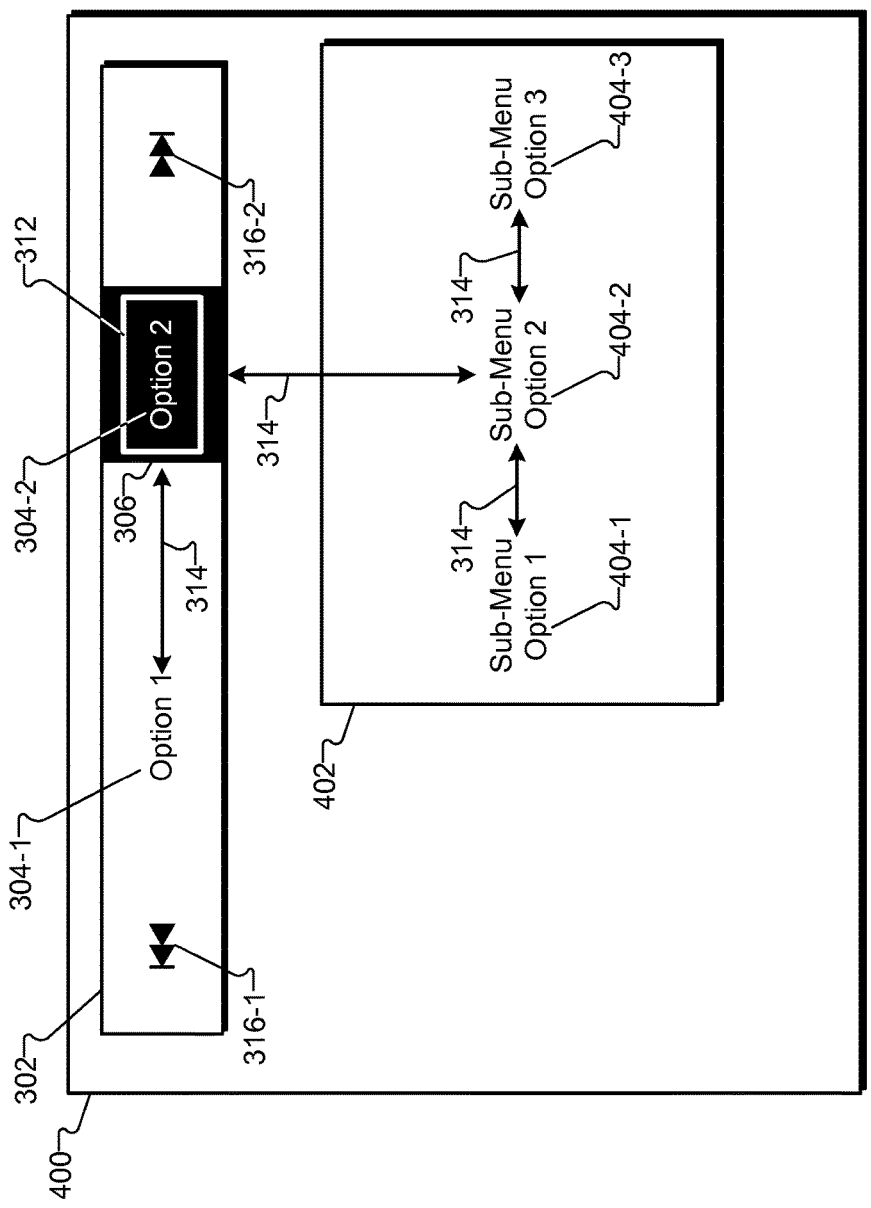
Figure 5:
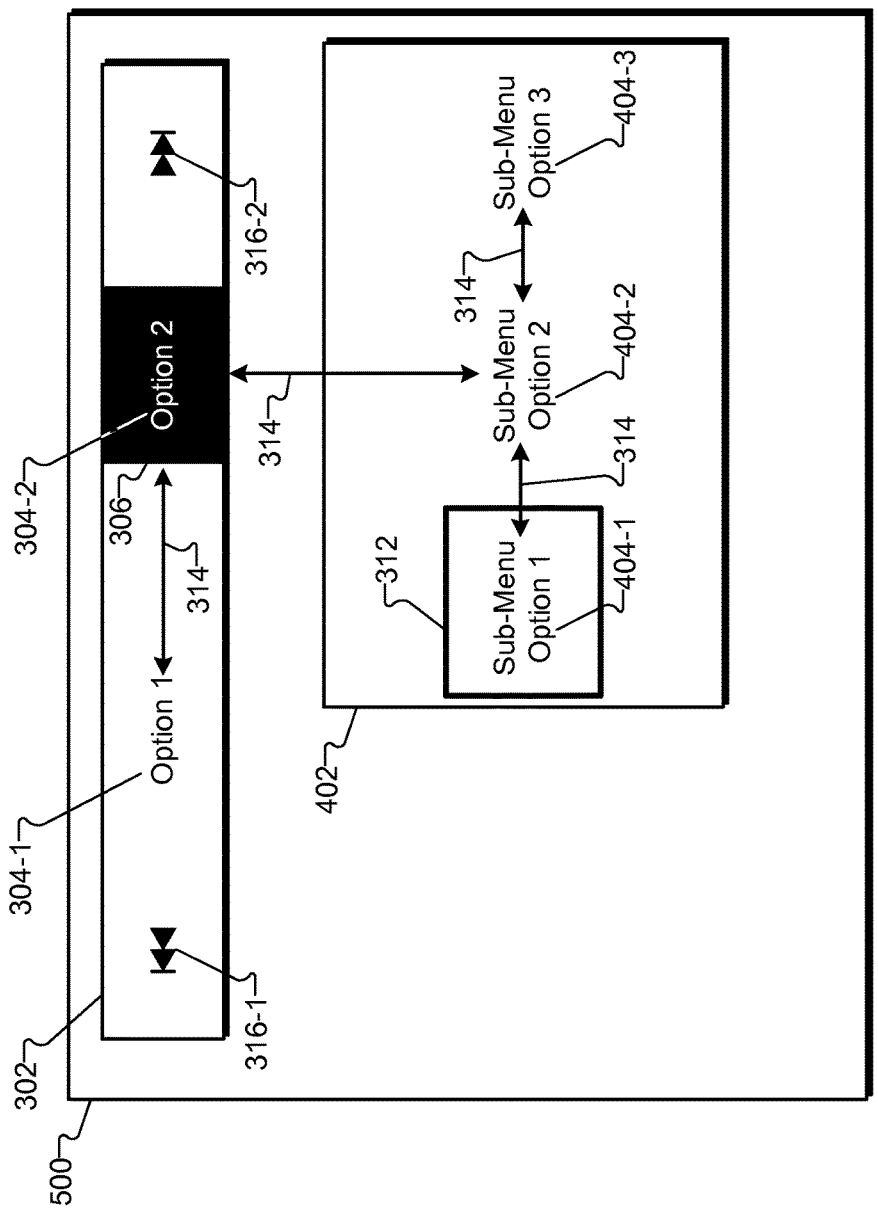
Figure 6:
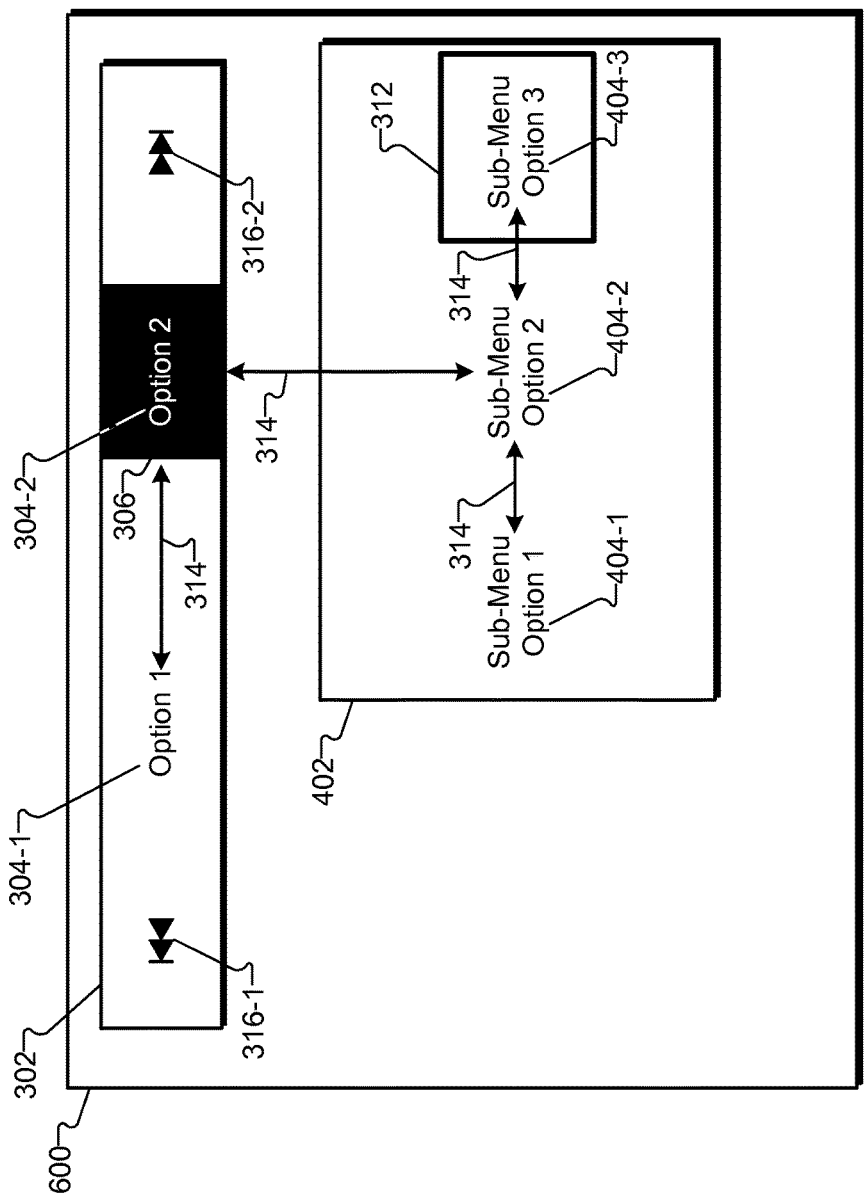

FIGS. 4-6 illustrate examples of GUI views 400-600 that may be provided by user interface facility 104 when the active status is toggled to high-level menu option 304-2. As shown in the GUI views 400-600 in FIGS. 4-6, in response to the toggling of the active status from high-level menu option 304-1 to high-level menu option 304-2, user interface facility 104 may activate a sub-menu 402 corresponding to high-level menu option 304-2, which may include user interface facility 104 providing at least a portion of sub-menu 402 for display. In the illustrated example, sub-menu 402 includes sub-menu options 404 (e.g., sub-menu option 404-1 through sub-menu option 404-3).

In addition, in response to the toggling of the active status from high-level menu option 304-1 to high-level menu option 304-2, user interface facility 104 may reposition selector 312 such as by moving selector 312 from sub-menu option 310-3 to a position associated with high-level menu option 304-2 and/or sub-menu 402.

As an example, user interface facility 104 may position selector 312 on the high-level menu option 304-2 to which the active status has been toggled, as illustrated in FIG. 4. User interface facility 104 may select the active high-level menu option 304-2 as the position for selector 312 in any suitable way, such as a default starting position when the active status is toggled to high-level menu option 304-2 or as a default position when the active status is toggled to high-level menu option 304-2 and no other last-known position of selector 312 within sub-menu 402 is known.

As another example, user interface facility 104 may position selector 312 at a predefined default position within sub-menu 402. For example, user interface facility 104 may position selector 312 on a first-ordered sub-menu option 404-1 within sub-menu 402, as shown in GUI view 500 of FIG. 5. Alternatively, user interface facility 104 may position selector 312 on a sub-menu option 404 that is positioned logically and/or spatially most proximate to high-level menu option 304-2 and/or high-level menu 302, such as on sub-menu option 404-2. Alternatively, user interface facility 104 may position selector 312 on any other sub-menu option 404 that is predefined as a starting default position for selector 312 when sub-menu 402 is activated.

As another example, user interface facility 104 may position selector 312 at a last-known position of the selector 312 within sub-menu 402 when sub-menu 402 previously had active status. For example, in response to the toggling of the active status to high-level menu option 304-2, user interface facility 104 may determine a last-known position of selector 312 within sub-menu 402 and position selector 312 at the same position. For instance, user interface facility 104 may determine that sub-menu option 404-3 is the last-known previous position of selector 312 within sub-menu 402 and, based on this determination, position selector 312 on sub-menu option 404-3, as shown in GUI view of FIG. 6.

When the active status is assigned to high-level menu option 304-2 as illustrated in FIGS. 4-6, the user may select a designated toggle button on a remote control device, such as by selecting backward skip button 220 of remote control device 202. In response, user interface facility 104 may toggle the active status from high-level menu option 304-2 back to high-level menu option 304-1 and, accordingly, reposition, within a GUI view, selector 312 from a position associated with high-level menu option 304-2 (e.g., a position within sub-menu 402) to a position associated with high-level menu option 304-1. For example, user interface facility 104 may position selector 312 at a predefined default position associated with high-level menu option 304-1 (e.g., on high-level menu option 304-1 in high-level menu 302 or on one of sub-menu options 310 predefined as a default position) or at the last-known position of selector 312 within sub-menu 308 (i.e., on sub-menu option 310-3 as shown in GUI view 300 in FIG. 3).

FIGS. 7-13 illustrate exemplary GUI views that may be provided by user interface facility 104 for display on a display screen of an electronic device, and with which a user may interact by providing input to system 100 using a remote control device as described herein. The exemplary GUI views shown in FIGS. 7-13 may include various menus, sub-menus, and options configured to be navigated by a user using a D-pad and/or designated toggle button(s) of the remote control device. In certain examples, the exemplary GUI views illustrated in FIGS. 7-13 may be views of a media service user interface through which a user of a media service (e.g., a media distribution service) may interact with the media service. The exemplary GUI views illustrated in FIGS. 7-13 will now be described in more detail.

Figure 7:
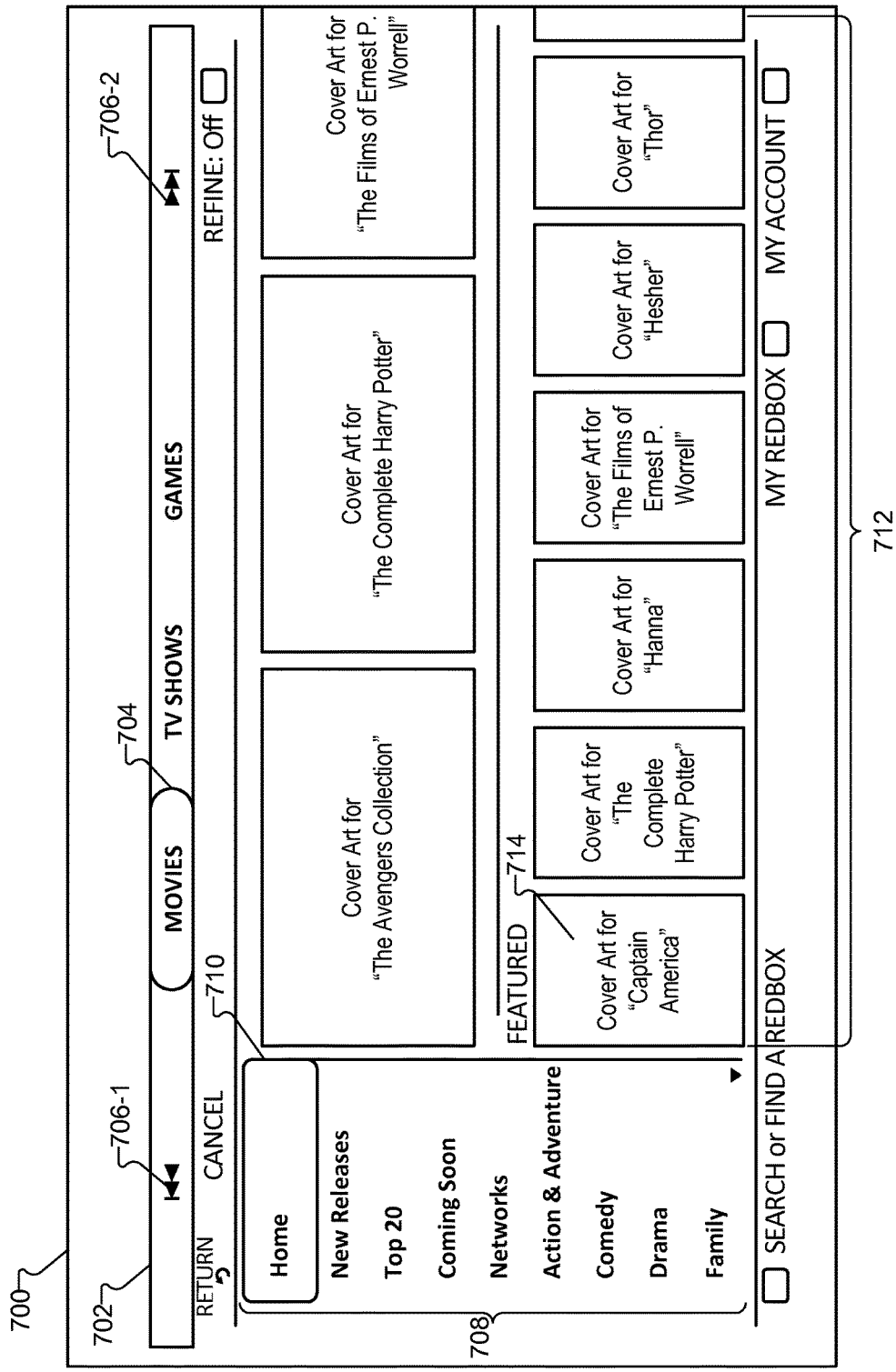

FIG. 7 illustrates an exemplary GUI view 700 as may be displayed on a display screen of an electronic device (e.g., on display screen 206 of electronic device 204). As shown, GUI view 700 may include a high-level menu 702 positioned horizontally across the top of GUI view 700. The high-level menu 702 may include various high-level menu options (e.g., high-level menu options labeled "Movies," "TV Shows," and "Games"). GUI view 700 may also include an active status indicator 704 within high-level menu 702 that indicates that the high-level menu option labeled "Movies," for example, is currently assigned the active status.

In addition to the high-level menu options included in high-level menu 702, high-level menu 702 may include graphical icons 706 (e.g., icon 706-1 and icon 706-2) representative of designated toggle buttons of a remote control device. As described herein, the toggle buttons may be designated to toggle the active status from one high-level menu option to another. In the illustrated example, icon 706-1 visually indicates a backward skip button, and icon 706-2 visually indicates a forward skip button of a remote control device.

While icons 706 are visually displayed within high-level menu 702 of GUI view 700 in this example and in similar examples described herein, other examples may omit the icons representative of toggle buttons of a remote control device from the GUI view(s), but continue to provide the same functionality of the toggle buttons as described herein. Alternatively, icons 706 may be placed at different positions within GUI view 700 (e.g., outside of high-level menu 702) in other examples.

With the high-level menu option labeled "Movies" having the assigned active status, a sub-menu 708 corresponding to the high-level menu option labeled "Movies" may be active and visually represented in GUI view 700 as shown in FIG. 7. Sub-menu 708 may include a list of sub-menu options (e.g., sub-menu options labeled "Home," "New Releases," "Top 20," "Coming Soon," "Networks," "Action & Adventure," "Comedy," "Drama," and "Family"). A selector box 710 ("selector 710") may be displayed in GUI view 700 to indicate a highlight-type selection of a selectable option in GUI view 700. In FIG. 7, selector 710 is positioned to indicate that the "Home" sub-menu option is currently selected. With the "Home" sub-menu option selected by selector 710, an additional set of sub-menu options 712 that are hierarchically sub-menu options of the "Home" sub-menu option may be displayed in GUI view 700. In the illustrated example, sub-menu options 712 include user-selectable cover art images representative of media programs accessible through a media service.

With sub-menu 708 active, sub-menu 708 is navigable by a user with a remote control device. To illustrate, when GUI view 700 is displayed as shown in FIG. 7, a user may use a D-pad of a remote control device to move selector 710 to indicate a selection of a sub-menu option included in sub-menu 708. For example, a user may navigate within the activated sub-menu 708 by providing directional input by way of the D-pad of the remote control device to position selector 710 on sub-menu option 714. In certain examples, in response to a positioning of selector 710 on sub-menu option 714, user interface facility 104 may update GUI view 700 to display, for example, additional sub-menus and associated sub-menu options.

Figure 8:
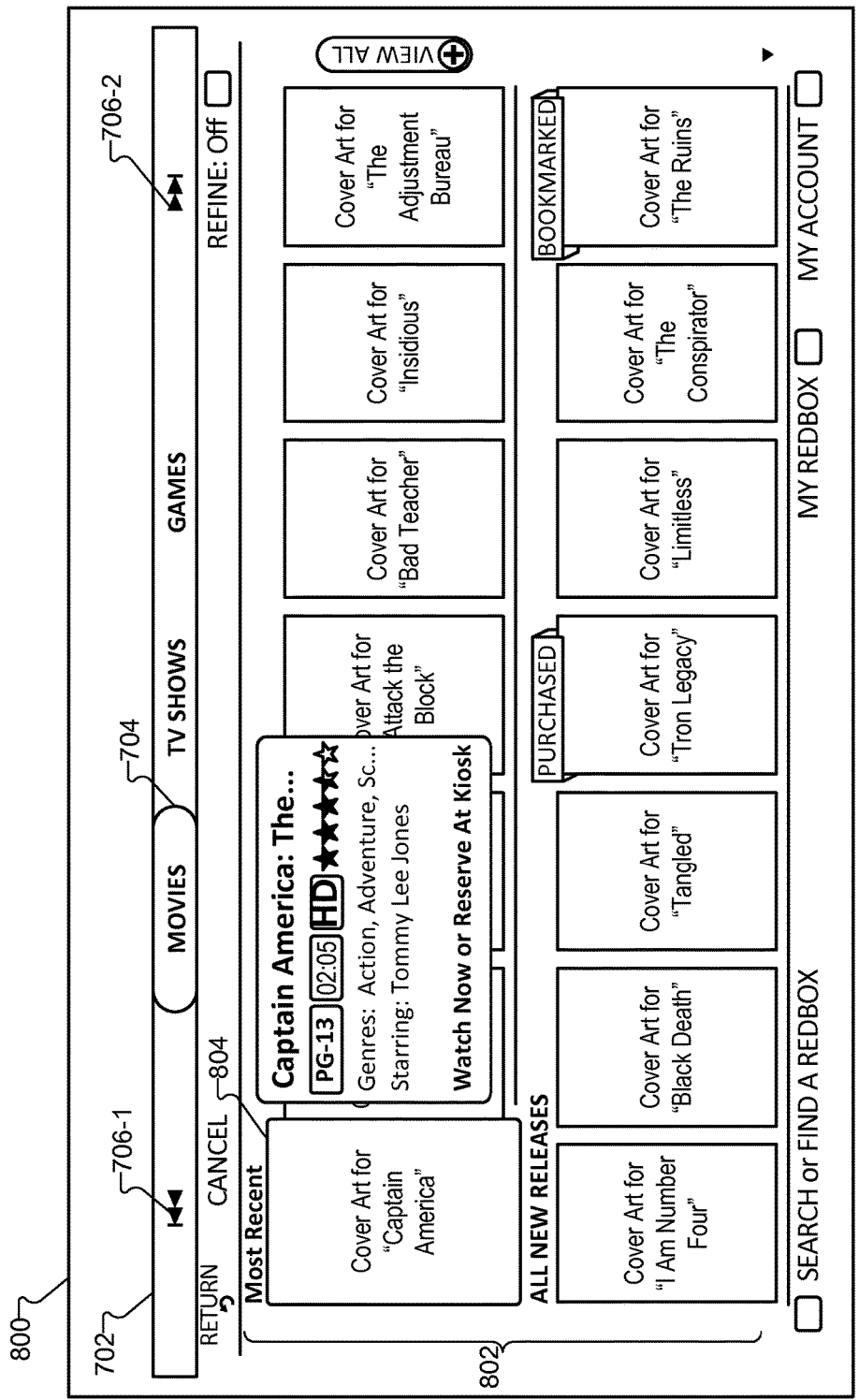

FIG. 8 illustrates an exemplary GUI view 800 as may be displayed on a display screen of an electronic device. In some examples, user interface facility 104 may provide GUI view 800 for display in response to a user selection of sub-menu option 714 in GUI view 700. Whether GUI view 800 is related to GUI view 700 in this manner or not related to GUI view 700, GUI view 800 illustrates another example of a sub-menu that may be active when the active status is assigned to the "Movies" high-level menu option of high-level menu 702. As illustrated in FIG. 8, GUI view 800 may include a visual representation of a sub-menu 802 that corresponds to the "Movies" high-level menu option and that includes sub-menu options in the form of user-selectable cover art images representing media programs. In the illustrated example, a selector 804 is positioned to indicate a selection of a sub-menu option labeled "Cover Art for Captain America" included within sub-menu 802.

Figure 9:
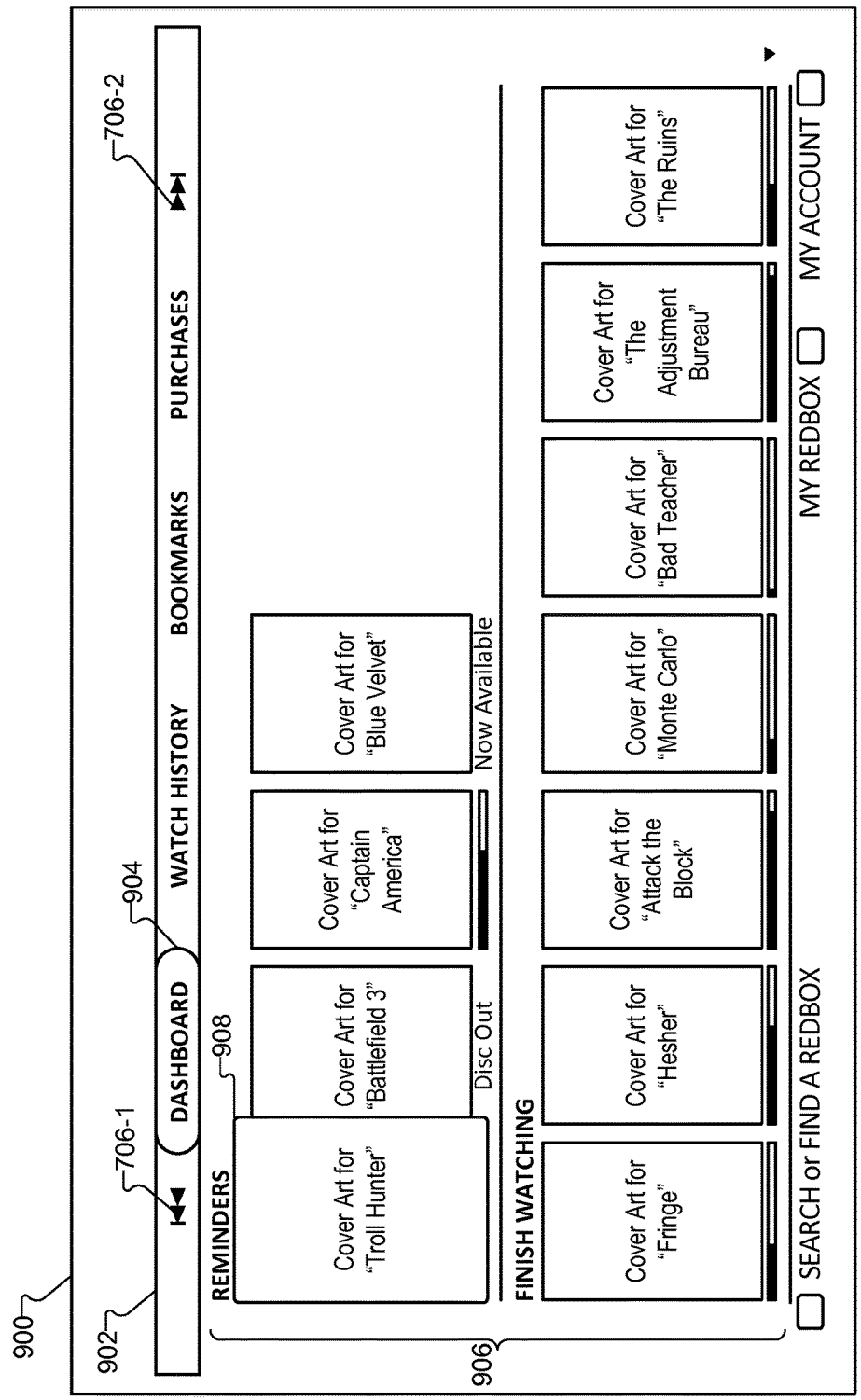

FIG. 9 illustrates an exemplary GUI view 900 as may be displayed on a display screen of an electronic device. GUI view 900 may illustrate another example of a high-level menu, high-level menu options, and an active sub-menu. As shown, GUI view 900 may include a high-level menu 902 including various high-level menu options (e.g., high-level menu options labeled "Dashboard," "Watch History," "Bookmarks," and "Purchases"). GUI view 900 may also include an active status indicator 904 within high-level menu 902 that indicates that the high-level menu option labeled "Dashboard," for example, is currently assigned the active status. In addition to the high-level menu options included in high-level menu 902, high-level menu 902 may include graphical icons 706 (e.g., icon 706-1 and icon 706-2) representative of toggle buttons of a remote control device that may be designated to toggle the active status from one high-level menu option to another.

With the high-level menu option labeled "Dashboard" having the assigned active status, a sub-menu 906 corresponding to the high-level menu option labeled "Dashboard" may be active and visually represented in GUI view 900 as shown in FIG. 9. As shown in GUI view 900, sub-menu 906 may include sub-menu options in the form of user-selectable cover art images representing media programs. In the illustrated example, a selector 908 is positioned to indicate a selection of a sub-menu option labeled "Cover Art for Troll Hunter" included within sub-menu 906.

In some examples, while selector 908 is positioned within sub-menu 906, a user may provide, and user interface facility 104 may receive, user input to direct user interface facility 104 to toggle the active status from the high-level menu option labeled "Dashboard" to a next high-level menu option labeled "Watch History." For example, a user may select a forward skip button of a remote control device designated for use to toggle the active status between high-level menu options and, in response, user interface facility 104 may remove the active status from the high-level menu option labeled "Dashboard" and assign the active status to the high-level menu option labeled "Watch History".

In response to the removal of the active status from the high-level menu option labeled "Dashboard," user interface facility 104 may deactivate the associated sub-menu 906. Deactivation of sub-menu 906 may include removing a visual representation of sub-menu 906 from GUI view 900 and deactivating navigation of sub-menu 906 such that sub-menu 906 is no longer navigable by a user (e.g., with a D-pad of a remote control device).

In response to the assigning of the active status to the high-level menu option labeled "Watch History," user interface facility 104 may activate a sub-menu associated with the high-level menu option labeled "Watch History." Activation of the sub-menu associated with high-level menu option labeled "Watch History" may include presenting a visual representation of the sub-menu in a GUI view and activating navigation of the sub-menu such that the sub-menu becomes navigable by a user (e.g., with a D-pad of a remote control device).

Figure 10:
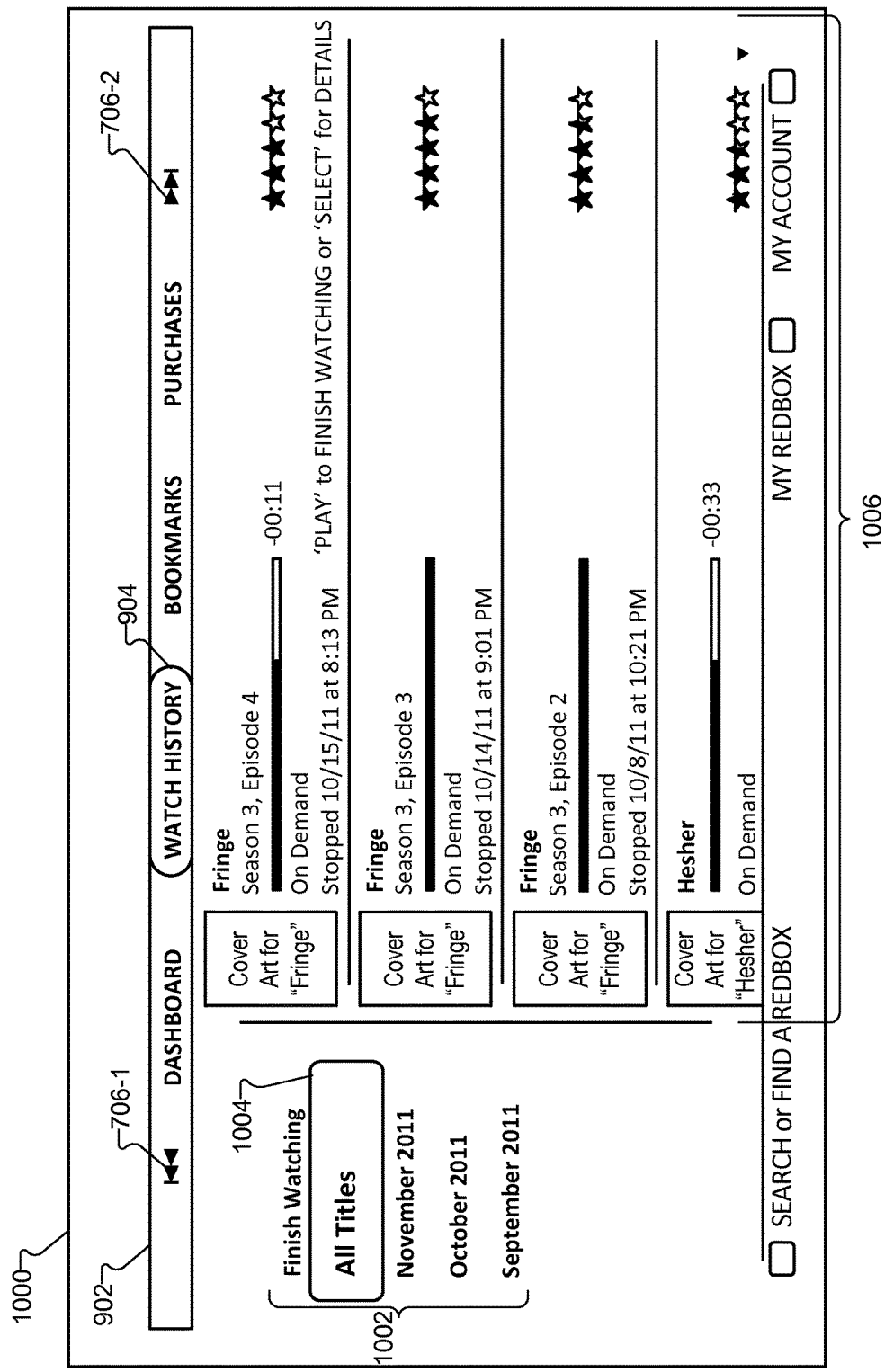

For example, FIG. 10 illustrates an exemplary GUI view 1000 as may be displayed on a display screen of an electronic device. In some examples, user interface facility 104 may provide the exemplary GUI view 1000 for display in response to the assigning of the active status to the high-level menu option labeled "Watch History." Active status indicator 904, as shown in GUI view 1000, may indicate that the high-level menu option labeled "Watch History" has the active status. Additionally, in response to assigning the active status to the high-level menu option labeled "Watch History," user interface facility 104 may activate a sub-menu 1002, provide a visual representation of the activated sub-menu 1002 in GUI view 1000, and activate navigation of the activated sub-menu 1002 (e.g., with a D-pad of a remote control device).

As shown in GUI view 1000, sub-menu 1002 may include a list of sub-menu options (e.g., sub-menu options labeled "Finish Watching," "All Titles," "November 2011," "October 2011," and "September 2011"). A selector box 1004 ("selector 1004") may be displayed in GUI view 1000 to indicate a highlight-type selection of a selectable option in GUI view 1000. In FIG. 10, selector 1004 is positioned to indicate that the "All Titles" sub-menu option is currently selected. With the "All Titles" sub-menu option selected by selector 1004, an additional set of sub-menu options 1006 that are hierarchically sub-menu options of the "All Titles" sub-menu option may be displayed in GUI view 1000. In the illustrated example, sub-menu options 1006 include user-selectable cover art images representative of media programs (e.g., various episodes of media programs titled "Fringe" and "Hesher") accessible through a media service.

When GUI view 1000 is displayed as shown in FIG. 10, a user may use a D-pad of a remote control device to move selector 1004 to indicate a selection of a sub-menu option included in sub-menu 1002.

Figure 11:
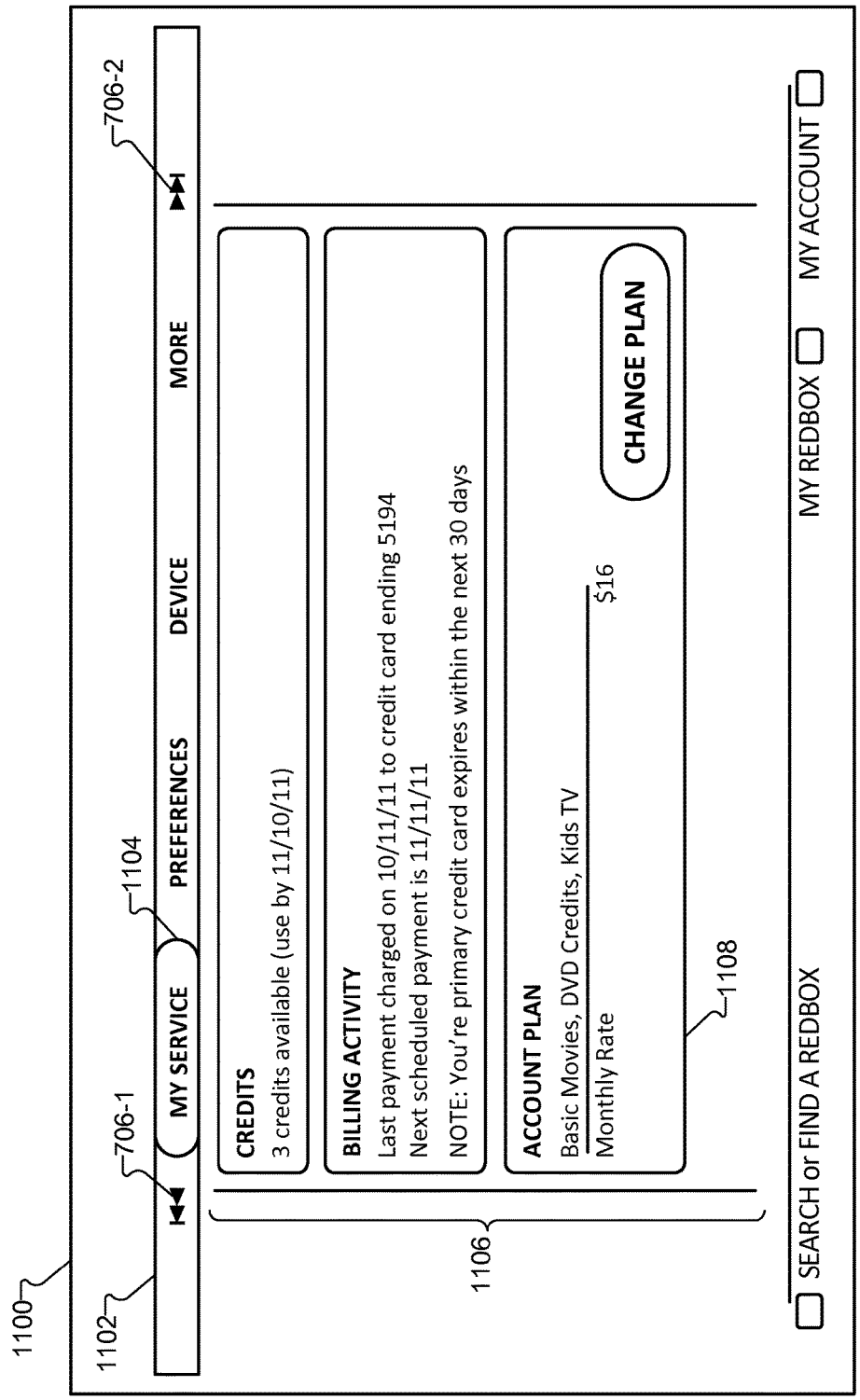

FIG. 11 illustrates an exemplary GUI view 1100 as may be displayed on a display screen of an electronic device. GUI view 1100 may illustrate another example of a high-level menu, high-level menu options, and an active sub-menu. As shown, GUI view 1100 may include a high-level menu 1102 including various high-level menu options (e.g., high-level menu options labeled "My Service," "Preferences," "Device," and "More"). GUI view 1100 may also include an active status indicator 1104 within high-level menu 1102 that indicates that the high-level menu option labeled "My Service," for example, is currently assigned the active status. In addition to the high-level menu options included in high-level menu 1102, high-level menu 1102 may include graphical icons 706 (e.g., icon 706-1 and icon 706-2) representative of toggle buttons of a remote control device that may be designated to toggle the active status between high-level menu options included in the high-level menu.

With the high-level menu option labeled "My Service" having the assigned active status, a sub-menu 1106 corresponding to the high-level menu option labeled "My Service" may be active and visually represented in GUI view 1100 as shown in FIG. 11. As shown in GUI view 1100, sub-menu 1106 may include various user-selectable sub-menu options (e.g., sub-menu options labeled "Credits," "Billing Activity," and "Account Plan"). In the illustrated example, a selector 1108 is positioned to indicate a highlight-selection of the sub-menu option labeled "Account Plan" included within sub-menu 1106.

In some examples, while selector 1108 is positioned within sub-menu 1106, a user may provide input to direct user interface facility 104 to toggle the active status from the high-level menu option labeled "My Service" to a next high-level menu option labeled "Preferences" included in high-level menu 1102. For example, a user may select a designated toggle button such as a forward skip button of a remote control device and, in response, user interface facility 104 may toggle the active status from the high-level menu option labeled "My Service" to the high-level menu option labeled "Preferences" by removing the active status from the high-level menu option labeled "My Service" and reassigning the active status to the high-level menu option labeled "Preferences".

In response to the assigning of the active status to the high-level menu option labeled "Preferences," user interface facility 104 may activate a sub-menu associated with the high-level menu option labeled "Preferences." Activation of the sub-menu associated with high-level menu option labeled "Preferences" may include presenting a visual representation of the sub-menu in a GUI view and activating navigation of the sub-menu such that the sub-menu becomes navigable by a user (e.g., with a D-pad of a remote control device).

Figure 12:
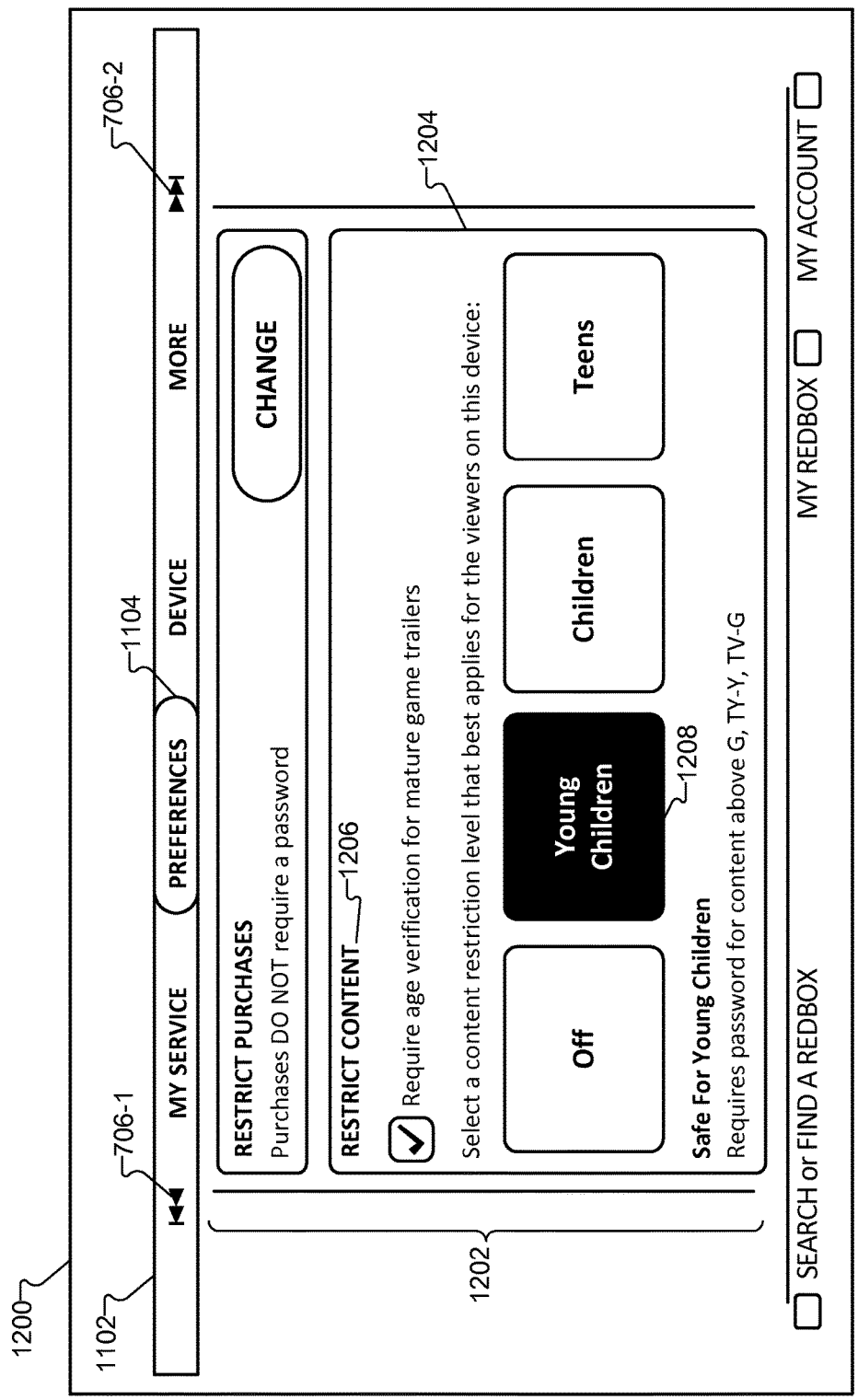

For example, FIG. 12 illustrates an exemplary GUI view 1200 as may be displayed on a display screen of an electronic device. In some examples, user interface facility 104 may provide the exemplary GUI view 1200 for display in response to the assigning of the active status to the high-level menu option labeled "Preferences." Active status indicator 1104, as shown in GUI view 1200, indicates that the "Preferences" high-level menu option has the active status. Additionally, in response to assigning the active status to the high-level menu option labeled "Preferences," user interface facility 104 may activate a sub-menu 1202, provide a visual representation of the activated sub-menu 1202 in GUI view 1000, and activate navigation of the activated sub-menu 1202 (e.g., with a D-pad of a remote control device).

In certain examples, in response to toggling the active status from the high-level menu option labeled "My Service" to the high-level menu option labeled "Preferences," user interface facility 104 may position a selector 1204 within the activated sub-menu 1202 according to a predefined default position or a last-known position of selector 1204 when sub-menu 1202 was previously activated. For example, selector 1204 may be positioned to indicate a selection of a sub-menu option 1206 labeled "Restrict Content" in accordance with the last-known position of selector 1204 when sub-menu 1202 was previously activated. Sub-menu option 1206 may include or otherwise be associated with one or more sub-menu options that are hierarchically sub-menu options of sub-menu option 1206. In the illustrated example, sub-menu option 1206 includes a set of sub-menu options labeled "Off," "Young Children," "Children," and "Teens". A particular sub-menu option 1208 within these sub-menu options may be selected, as indicated by a highlight-type selection in GUI view 1200, based on a last-known selection of the sub-menu option 1208 when sub-menu 1202 was previously activated.

Figure 13:
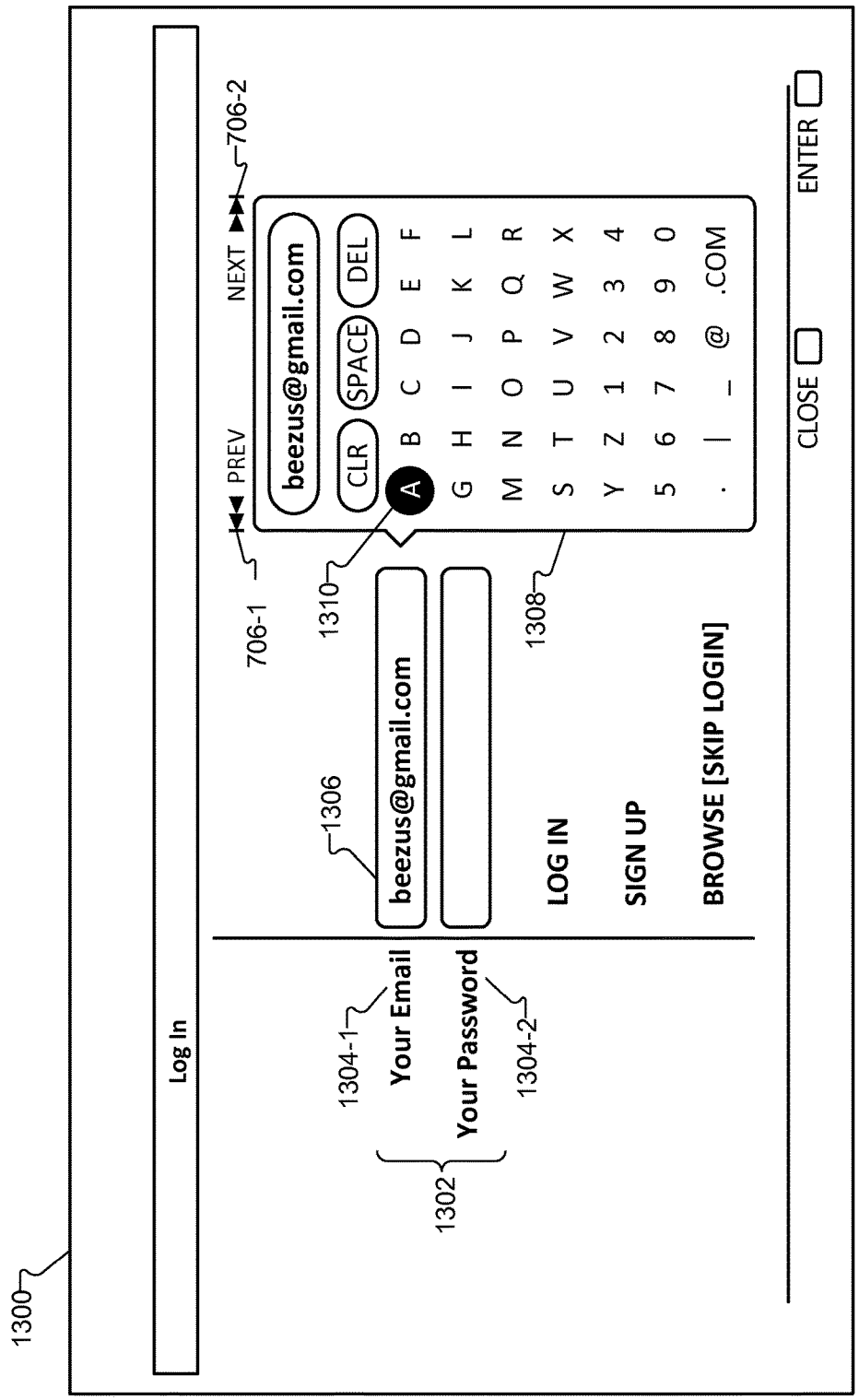

FIG. 13 illustrates an additional exemplary GUI view 1300 as may be displayed on a display screen of an electronic device. GUI view 1300 may illustrate another example of a high-level menu, high-level menu options, and an active sub-menu. As shown, GUI view 1300 may include a high-level menu 1302 including various high-level menu options 1304 (e.g., high-level menu option 1304-1 labeled "Your Email" and high-level menu option 1304-2 labeled "Your Password" included in a "Log In" high-level menu). High-level menu 1302 may be an input form, and high-level menu options 1304 may include or otherwise be associated with input fields of the input form. GUI view 1300 may include an active status indicator 1306 that indicates which of the high-level menu options 1304 has the active status. In the illustrated example, the active status indicator 1306 is positioned on a text input field corresponding to high-level menu option 1304-1 labeled "Your Email."

With the high-level menu option 1304-1 having the assigned active status, a sub-menu 1308 corresponding to the high-level menu option 1304-1 may be active and visually represented in GUI view 1300. In the illustrated example, the sub-menu 1308 includes a virtual keypad for use by the user to select text for inclusion in the input field corresponding to high-level menu option 1304-1. The virtual keypad may include sub-menu options in the form of user-selectable characters representing numbers, letters, symbols, etc. that may be navigated and selected by a user using, for example, a D-pad of a remote control device. In the illustrated example, a selector 1310 is positioned to indicate a highlight-selection of a character labeled "A" within the virtual keypad. In certain examples, a user may move selector 1310 within the virtual keypad using directional buttons 210 through 216 of remote control device 202, and select the highlighted characters of the virtual keypad using select button 218 of remote control device 202 in order to provide input to the input field corresponding to high-level menu option 1304-1. As shown in GUI view 1300, the input provided to the input field corresponding to high-level menu option 1304-1 may include, for example, a user's email address.

In certain examples, GUI view 1300 may include graphical icons 706 (e.g., icon 706-1 and icon 706-2) representing toggle buttons of a remote control device designated to toggle the active status between high-level menu options 1304. In this example, icon 706-1 may represent a backward skip button, and icon 706-2 may represent a forward skip button of a remote control device. When used in connection with high-level menu 1302, graphical icons 706 may be representative of toggle buttons of a remote control device designated to tab between input fields corresponding to high-level menu options 1304 of high-level menu 1302. It will be recognized that the graphical icons 706 shown in GUI view 1300 may be visually represented anywhere within GUI view 1300, or may be omitted from GUI view 1300 and the functionality of the designated toggle buttons maintained.

To illustrate the use of the designated buttons of the remote control device used to tab between input fields of an input form, in some examples, while selector 1310 is positioned within sub-menu 1308, a user may provide input to direct user interface facility 104 to tab between input fields corresponding to high-level menu options 1304 of high-level menu 1302. For example, a user may select a forward skip button of a remote control device to direct user interface facility 104 to tab from the input field corresponding to high-level menu option 1304-1 to the input field corresponding to high-level menu option 1304-2 within high-level menu 1302. In response, user interface facility 104 may remove the active status from high-level menu option 1304-1 and assign the active status to high-level menu option 1304-2, such as described herein.

Figure 14:
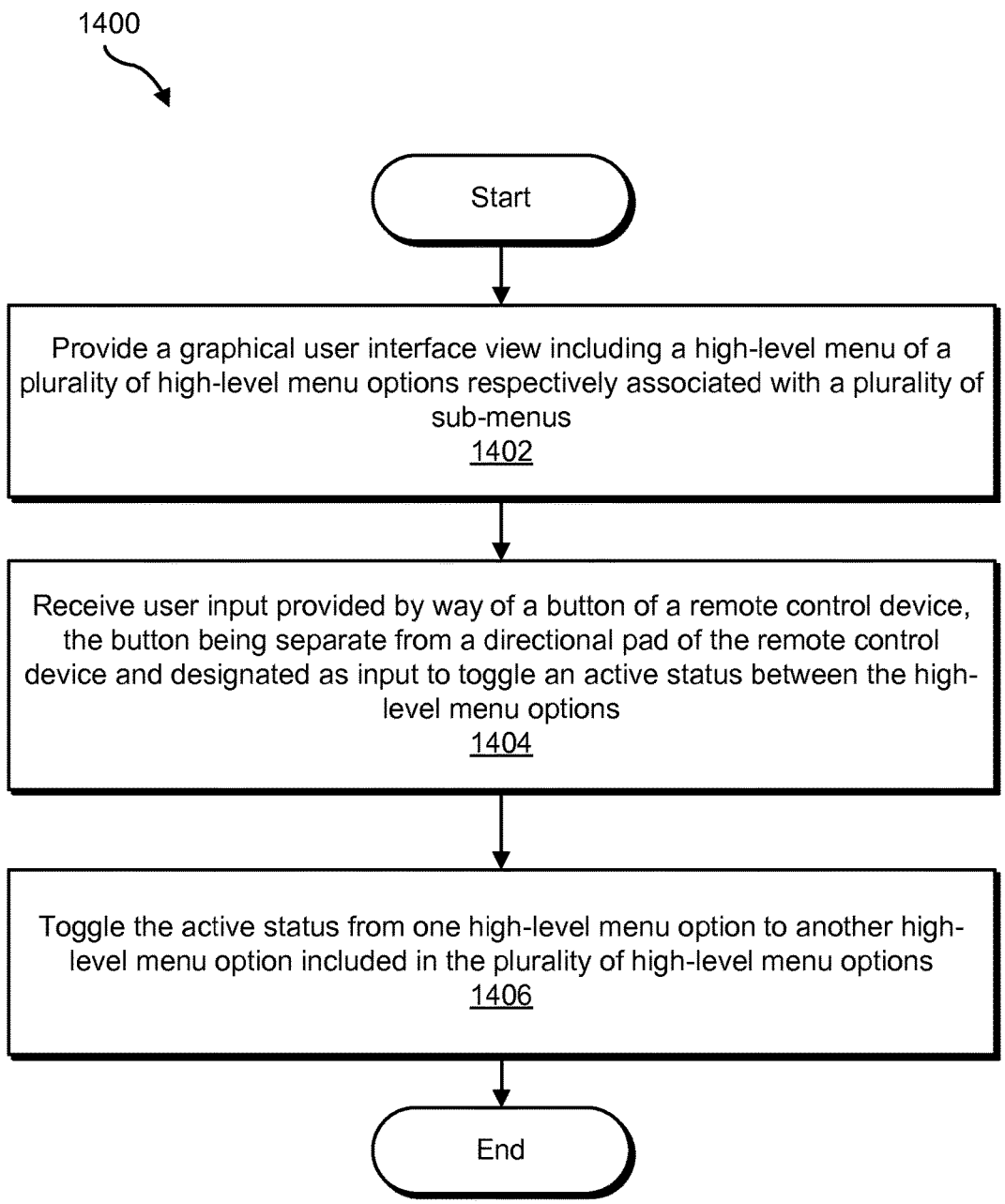
FIGS. 14-15 illustrate exemplary methods of remote control device based interaction with a graphical user interface according to principles described herein.
Figure 15:
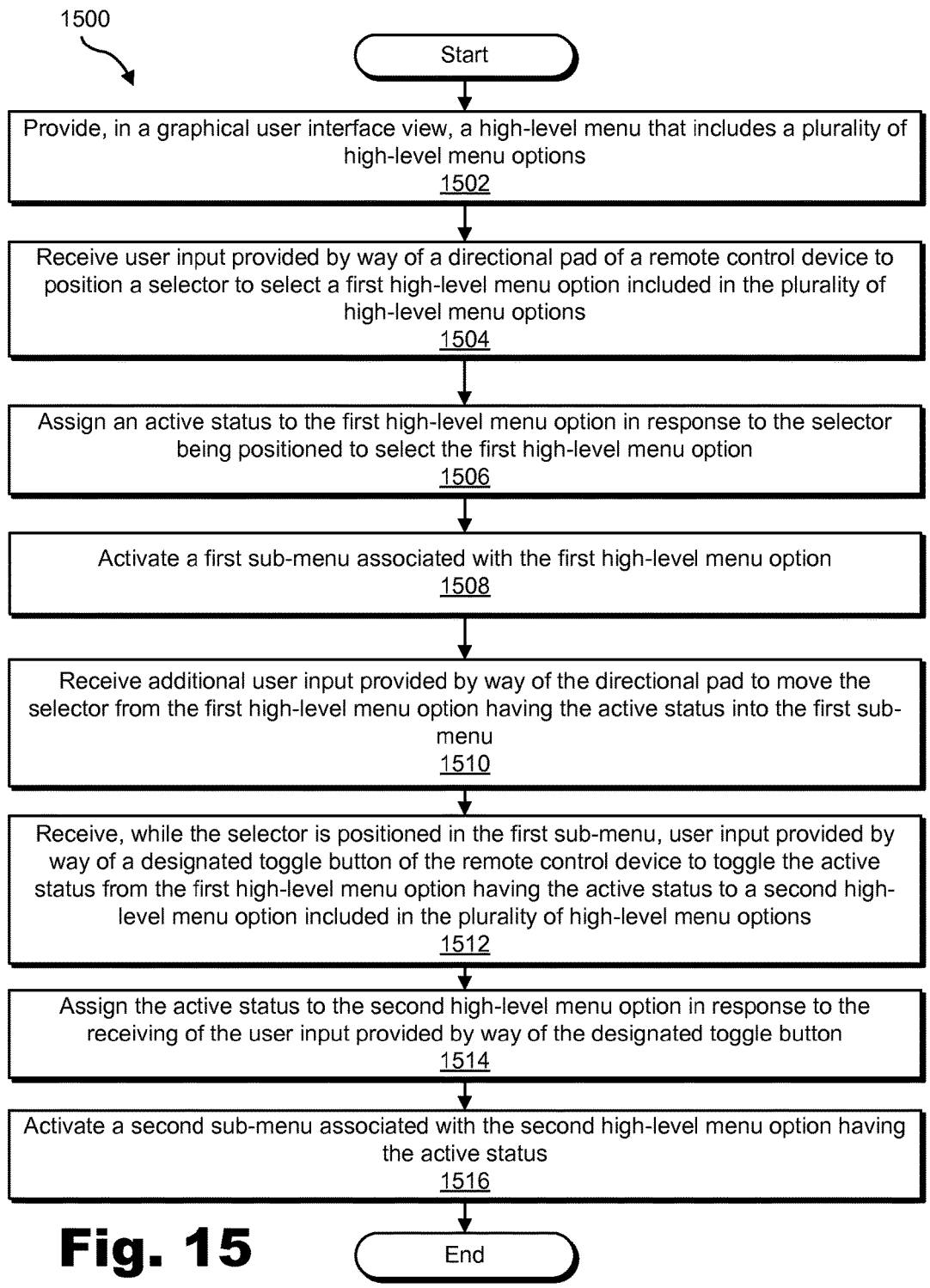

FIGS. 14-15 illustrate exemplary methods for remote control device based interaction with a GUI (i.e., methods 1400 and 1500). While FIGS. 14-15 illustrate exemplary steps according to certain embodiments, other embodiments may omit, add to, reorder, combine, and/or modify any of the steps shown in FIGS. 14-15. One or more of the steps shown in certain methods illustrated in FIGS. 14-15 may be combined with and/or performed in conjunction with (e.g., performed before or after) one or more steps of one or more other methods illustrated in FIGS. 14-15. The methods illustrated in FIGS. 14-15 may be performed by any component or combination of components of system 100.

Turning to method 1400 in FIG. 14, in step 1402, a user interface system (e.g., system 100) provides a graphical user interface view (e.g., for display on a display screen) that includes a high-level menu of a plurality of high-level menu options respectively associated with a plurality of sub-menus, such as described herein.

In step 1404, the user interface system receives user input provided by way of a button of a remote control device, the button being separate from a directional pad of the remote control device and designated as input to toggle an active status between the high-level menu options, such as described herein.

In step 1406, the user interface system toggles, e.g., in response to the receiving of the user input provided by way of the button designated as input to toggle the active status between the high-level menu options, the active status from one high-level menu option to another high-level menu option included in the plurality of high-level menu options, such as described herein.

As an example, a first high-level menu option included in the plurality of high-level menu options may be assigned to have an active status, and a first sub-menu included in the plurality of sub-menus and corresponding to the first high-level menu option may be configured to be navigated by a user providing input by way of a directional pad of a remote control device when the first high-level menu option has the active status, such as described herein. While the first high-level menu option has the active status, user input may be received in step 1404, as described herein. In response, the system may toggle the active status from the first high-level menu option to a second high-level menu option included in the plurality of high-level menu options. With the active status now assigned to the second high-level menu option, a second sub-menu included in the plurality of sub-menus and corresponding to the second high-level menu option may be configured to be navigated by the user providing input by way of the directional pad of the remote control device, such as described herein.

Turning to method 1500 in FIG. 15, in step 1502, a user interface system (e.g., system 100) provides, in a graphical user interface view for display on a display screen, a high-level menu that includes a plurality of high-level menu options, such as described herein.

In step 1504, the user interface system receives user input provided by way of a directional pad of a remote control device to position a selector to select a first high-level menu option included in the plurality of high-level menu options, such as described herein.

In step 1506, the user interface system assigns an active status to the first high-level menu option in response to the selector being positioned to select the first high-level menu option, such as described herein.

In step 1508, the user interface system activates, e.g., in response to the assigning of the active status to the first high-level menu option, a first sub-menu associated with the first high-level menu option such that the first sub-menu becomes navigable by way of the directional pad of the remote control device, such as described herein.

In step 1510, the user interface system receives additional user input provided by way of the directional pad to move the selector from the first high-level menu option having the active status into the first sub-menu, such as described herein.

In step 1512, the user interface system receives, while the selector is positioned in the first sub-menu, user input provided by way of a button of the remote control device, the button being separate from the directional pad of the remote control device and designated as input to toggle the active status from the first high-level menu option having the active status to a second high-level menu option included in the plurality of high-level menu options, such as described herein.

In step 1514, the user interface system assigns the active status to the second high-level menu option in response to the receiving of the user input provided by way of the button designated as input to toggle the active status, such as described herein.

In step 1516, the user interface system activates, e.g., in response to assigning of the active status to the second high-level menu option, a second sub-menu that is associated with the second high-level menu option having the active status such that the second sub-menu becomes navigable by way of the directional pad of the remote control device, such as described herein.

One or more of the steps of method 1500 and/or method 1600 may be repeated. For example, one or more of the steps may be repeated for an additional toggling of active status between high-level menu options, such as a toggling from a second high-level menu option back to a first high-level menu option or from a second high-level menu option to a third high-level menu option.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a physical computer processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 16:
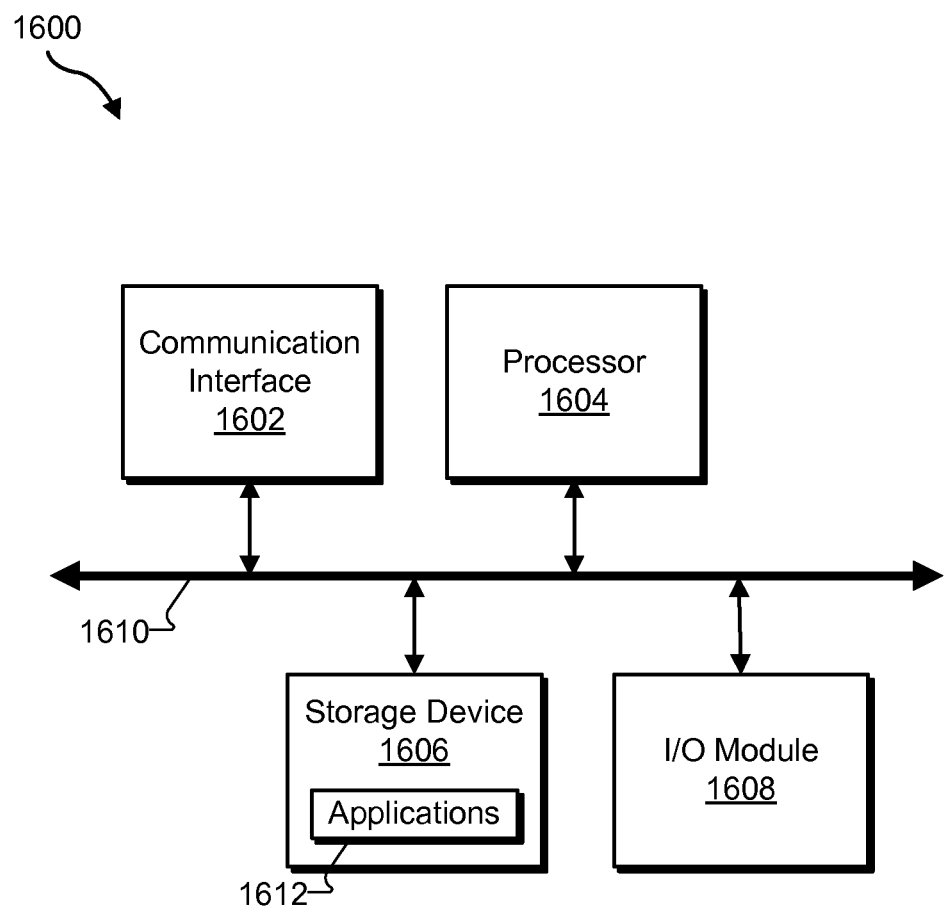
FIG. 16 illustrates an exemplary computing device according to principles described herein.

FIG. 16 illustrates an exemplary computing device 1600 that may be configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a communications medium interface, a modem, and any other suitable interface. Communication interface 1602 may be configured to interface with any suitable communication media, protocols, and formats, including any of those mentioned above.

Processor 1604 generally represents any type or form of processing unit capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1606. For example, data representative of one or more executable applications 1612 (which may include, but are not limited to, one or more of the software applications configured to direct processor 1604 to perform any of the operations described herein may be stored within storage device 1606.

I/O module 1608 may be configured to receive user input and provide user output and may include any hardware, firmware, software, or combination thereof supportive of input and output capabilities. For example, I/O module 1608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more processes or functions associated with user input facility 102, and/or user interface facility 104. Likewise, storage facility 106 may be implemented by or within storage device 1406. In such implementations, system 100 may be referred to as a computer-implemented system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   providing, by a user interface system, a graphical user interface ("GUI") view for display on a display screen, the GUI view including:
   a high-level menu of a plurality of high-level menu options respectively associated with a plurality of sub-menus,
   a first high-level menu option included in the plurality of high-level menu options assigned to have an active status, a first sub-menu included in the plurality of sub-menus and corresponding to the first high-level menu option, the first sub-menu comprising a plurality of sub-menu options,
a selector positioned within the first sub-menu and configured to be moved within the first sub-menu by a user providing input by way of a directional pad ("D-pad") of a remote control device when the first high-level menu option has the active status, the selector positioned to indicate a first sub-menu option included in the plurality of sub-menu options, and
an additional set of sub-menu options that are hierarchical sub-menu options of the first sub-menu option, the additional set of sub-menu options arranged in a plurality of rows of sub-menu options, each row in the plurality of rows of sub-menu options comprising:
a cover art image representative of at least one media program available by way of a media service, and
a visual representation of information regarding previous playback of the at least one media program by the user;
receiving, by the user interface system while the first high-level menu option has the active status, user input provided by way of a button of the remote control device, the button being separate from the D-pad of the remote control device and designated as input to toggle the active status between the high-level menu options;
toggling, by the user interface system in response to the receiving of the user input provided by way of the button designated as input to toggle the active status between the high-level menu options, the active status from the first high-level menu option to a second high-level menu option included in the plurality of high-level menu options; and
updating, by the user interface system in response to the toggling of the active status, the GUI view by moving the selector from the first sub-menu to a position within a second sub-menu included in the plurality of sub-menus and corresponding to the second high-level menu option in the GUI view, the position within the second sub-menu determined based on a previous selector position within the second sub-menu when the second high-level menu option was previously assigned the active status, the selector configured to be moved within the second sub-menu by the user providing input by way of the D-pad of the remote control device when the second high-level menu option has the active status.

2. The method of claim 1, wherein the toggling of the active status from the first high-level menu option to the second high-level menu option comprises removing the active status from the first high-level menu option and assigning the active status to the second high-level menu option.

3. The method of claim 2, wherein the toggling of the active status from the first high-level menu option to the second high-level menu option further comprises:
deactivating D-pad navigation of the first sub-menu associated with the first high-level menu option in response to the removing of the active status from the first high-level menu option; and
activating D-pad navigation of the second sub-menu associated with the second high-level menu option in response to the assigning of the active status to the second high-level menu option.

4. The method of claim 1, wherein the GUI view further includes a graphical representation of the button of the remote control device designated as input to toggle the active status between the high-level options.

5. The method of claim 4, wherein the graphical representation of the designated button of the remote control device is positioned within the high-level menu of the GUI view.

6. The method of claim 1, wherein:
when the first high-level menu option has the active status, the GUI view further includes a graphical representation of the first sub-menu and the selector positioned within the first sub-menu; and
the user input provided by way of the button of the remote control device designated as input to toggle the active status between the high-level menu options is received while the selector is positioned within the first sub-menu.

7. The method of claim 1, further comprising:
receiving, by the user interface system, while the second high-level menu option has the active status, additional user input provided by way of the button of the remote control device, the button being separate from the D-pad of the remote control device and designated as input to toggle the active status between the high-level menu options; and
toggling, by the user interface system in response to the receiving of the additional user input provided by way of the button designated as input to toggle the active status between the high-level menu options, the active status from the second high-level menu option to a third high-level menu option included in the plurality of high-level menu options, a third sub-menu included in the plurality of sub-menus and corresponding to the third high-level menu option configured to be navigated by the user providing input by way of the D-pad of the remote control device when the third high-level menu option has the active status.

8. The method of claim 1, further comprising:
providing, by the user interface system, an additional GUI view for display on the display screen, the additional GUI view including an input form having a plurality of input fields;
wherein the button of the remote control device designated as input to toggle the active status between the high-level menu options in the GUI view is designated for use by the user to tab between the input fields of the input form in the additional GUI view.

9. The method of claim 8, wherein a graphical representation of the button of the remote control device designated for use by the user to tab between the input fields of the input form is included within the additional GUI view.

10. The method of claim 1, embodied as computer-executable instructions on at least one non-transitory computer-readable medium.

11. The method of claim 1, wherein:
at least a portion of the high-level menu is disposed horizontally within a first portion of the GUI view;
at least a portion the first sub-menu is disposed vertically within a second portion of the GUI view; and
at least a portion of the additional set of sub-menu options is disposed horizontally within a third portion of the GUI view.

12. The method of claim 1, wherein:
the second sub-menu comprises a second plurality of sub-menu options;

the moving of the selector from the first sub-menu to the position within the second sub-menu comprises positioning the selector within the second plurality of sub-menu options to indicate a second sub-menu option included in the second plurality of sub-menu options; and the updating of the GUI view further comprises:
removing, from the GUI view, the additional set of sub-menu options; and
including, in the GUI view, another additional set of sub-menu options that are hierarchical sub-menu options of the second sub-menu option.

13. The method of claim 1, wherein the plurality of rows of sub-menu options comprises:
a first row of sub-menu options, the cover art image of the first row of sub-menu options representative of a collection of media programs available by way of the media service; and
a second row of sub-menu options, the cover art image of the second row of sub-menu options representative of a media program included in the collection of media programs.

14. The method of claim 1, wherein:
the first sub-menu is disposed vertically within the GUI view; and
the second sub-menu is disposed horizontally within the GUI view.

15. The method of claim 1, wherein the visual representation of information regarding previous playback of the at least one media program by the user comprises a visual representation of at least one of a date and a time of day at which a previous playback of the at least one media program was discontinued.

16. The method of claim 1, wherein the visual representation of information regarding previous playback of the at least one media program by the user comprises a visual representation of a playback position within the at least one media program at which a previous playback of the at least one media program was discontinued.

17. A method comprising:
providing, by a user interface system and in a graphical user interface ("GUI") view for display on a display screen, a high level menu that includes a plurality of high-level menu options;
receiving, by the user interface system, user input provided by way of a directional pad ("D-pad") of a remote control device to position a selector to select a first high-level menu option included in the plurality of high-level menu options;
assigning, by the user interface system, an active status to the first high-level menu option in response to the selector being positioned to select the first high-level menu option;
activating, by the user interface system in response to the assigning of the active status to the first high-level menu option, a first sub-menu associated with the first high-level menu option such that the first sub-menu becomes navigable by way of the D-pad of the remote control device, the first sub-menu comprising a plurality of sub-menu options;
receiving, by the user interface system, additional user input provided by way of the D-pad to move the selector from the first high-level menu option having the active status into the first sub-menu;

positioning, by the user interface system in response to the receiving of the additional user input, the selector to indicate a first sub-menu option included in the plurality of sub-menu options;
providing, by the user interface system in response to the positioning of the selector to indicate the first sub-menu option, an additional set of sub-menu options that are hierarchical sub-menu options of the first sub-menu option, the additional set of sub-menu options arranged in a plurality of rows of sub-menu options, each row in the plurality of rows of sub-menu options comprising:
a cover art image representative of at least one media program available by way of a media service, and
a visual representation of information regarding previous playback of the at least one media program by the user;
receiving, by the user interface system while the selector is positioned in the first sub-menu, user input provided by way of a button of the remote control device, the button being separate from the D-pad of the remote control device and designated as input to toggle the active status from the first high-level menu option having the active status to a second high-level menu option included in the plurality of high-level menu options;
assigning, by the user interface system, the active status to the second high-level menu option in response to the receiving of the user input provided by way of the button designated as input to toggle the active status; and
activating, by the user interface system in response to the assigning of the active status to the second high-level menu option, a second sub-menu that is associated with the second high-level menu option such that the second sub-menu becomes navigable by way of the D-pad of the remote control device, the activating comprising moving the selector from the first sub-menu to a position within the second sub-menu, the position within the second sub-menu determined based on a previous selector position within the second sub-menu when the second high-level menu option was previously assigned the active status.

18. The method of claim 17, wherein the providing of the high-level menu within the GUI view comprises including, within the high-level menu, a graphical representation of the button designated as input to toggle the active status.

19. The method of claim 17, embodied as computer-executable instructions on at least one non-transitory computer-readable medium.

20. A system comprising:
at least one physical computing device that:
provides a graphical user interface ("GUI") view for display on a display screen, the GUI view including:
a high-level menu of a plurality of high-level menu options respectively associated with a plurality of sub-menus,
a first high-level menu option included in the plurality of high-level menu options assigned to have an active status,
a first sub-menu included in the plurality of sub-menus and corresponding to the first high-level menu option, the first sub-menu comprising a plurality of sub-menu options,
a selector positioned within the first sub-menu and configured to be moved within the first sub-menu by a user providing input by way of a directional pad ("D-pad") of a remote control device when the first high-level menu option has the active status, the selector positioned to indicate a first sub-menu option included in the plurality of sub-menu options, and an additional set of sub-menu options that are hierarchical sub-menu options of the first sub-menu option, the additional set of sub-menu options arranged in a plurality of rows of sub-menu options, each row in the plurality of rows of sub-menu options comprising:
- a cover art image representative of at least one media program available by way of a media service, and
- a visual representation of information regarding previous playback of the at least one media program by the user;

receives, while the first high-level menu option has the active status, user input provided by way of a button of the remote control device, the button being separate from the D-pad of the remote control device and designated as input to toggle the active status between the high-level menu options;

toggles, in response to the receiving of the user input provided by way of the button designated as input to toggle the active status between the high-level menu options, the active status from the first high-level menu option to a second high-level menu option included in the plurality of high-level menu options; and updates, in response to the toggling of the active status, the GUI view by moving the selector from the first sub-menu to a position within a second sub-menu included in the plurality of sub-menus and corresponding to the second high-level menu option in the GUI view, the position within the second sub-menu determined based on a previous selector position within the second sub-menu when the second high-level menu option was previously assigned the active status, the selector configured to be moved within the second sub-menu by the user providing input by way of the D-pad of the remote control device when the second high-level menu option has the active status.

21. The system of claim 20, wherein the at least one physical computing device toggles the active status from the first high-level menu option to the second high-level menu option by removing the active status from the first high-level menu option and assigning the active status to the second high-level menu option.

22. The system of claim 21, wherein the at least one physical computing device toggles the active status from the first high-level menu option to the second high-level menu option by:

deactivating D-pad navigation of the first sub-menu associated with the first high-level menu option in response to the removing of the active status from the first high-level menu option; and activating D-pad navigation of the second sub-menu associated with the second high-level menu option in response to the assigning of the active status to the second high-level menu option.

23. The system of claim 20, wherein the GUI view further includes a graphical representation of the button of the remote control device designated as input to toggle the active status between the high-level options, the graphical representation of the designated button of the remote control device positioned within the high-level menu of the GUI view.

24. The system of claim 20, wherein:

when the first high-level menu option has the active status, the GUI view further includes a graphical representation of the first sub-menu and the selector positioned within the first sub-menu; and the user input provided by way of the button of the remote control device designated as input to toggle the active status between the high-level menu options is received while the selector is positioned within the first sub-menu.

25. The system of claim 20, wherein:

the at least one physical computing device further provides an additional GUI view for display on the display screen, the additional GUI view including an input form having a plurality of input fields; and the button of the remote control device designated as input to toggle the active status between the high-level menu options in the GUI view is designated for use by the user to tab between the input fields of the input form in the additional GUI view;

the additional GUI view including a virtual keypad for use by the user to select input for insertion into a selected one of the input fields having the active status.

* * * * *